United States Patent [19]
Satoh et al.

[11] Patent Number: 5,489,955
[45] Date of Patent: Feb. 6, 1996

[54] CAMERA HAVING SOUND RECORDING FUNCTION

[75] Inventors: Tatsuya Satoh; Kunio Yokoyama, both of Tokyo, Japan

[73] Assignee: Olympus Optical Co., Ltd., Tokyo, Japan

[21] Appl. No.: 315,192

[22] Filed: Sep. 29, 1994

Related U.S. Application Data

[63] Continuation of Ser. No. 96,488, Jul. 22, 1993, abandoned.

[30] Foreign Application Priority Data

Jul. 28, 1992 [JP] Japan .................................. 4-201426
Sep. 18, 1992 [JP] Japan .................................. 4-249912

[51] Int. Cl.⁶ .......................... G03B 17/24; G03B 29/00
[52] U.S. Cl. ............................................ 354/76; 354/106
[58] Field of Search ........................... 354/76, 105, 106, 354/109

[56] References Cited

U.S. PATENT DOCUMENTS

| | | | |
|---|---|---|---|
| 4,500,183 | 2/1985 | Tanikawa | 354/21 |
| 4,746,993 | 5/1988 | Tada | 358/909 X |
| 5,099,262 | 3/1992 | Tanaka et al. | 354/106 |
| 5,128,700 | 7/1992 | Inoue et al. | 354/76 |
| 5,276,472 | 1/1994 | Bell et al. | 354/76 |

FOREIGN PATENT DOCUMENTS

| | | |
|---|---|---|
| 61-277281 | 12/1986 | Japan . |
| 63-131782 | 6/1988 | Japan . |
| 63-131783 | 6/1988 | Japan . |

*Primary Examiner*—David M. Gray
*Assistant Examiner*—J. K. Han
*Attorney, Agent, or Firm*—Frishauf, Holtz, Goodman, Langer & Chick

[57] ABSTRACT

A camera having a sound recording function is disclosed, in which an object image is photographed/recorded, as an optical image transmitted through a photographic optical system or photoelectrically converted image data, on a film having a magnetic recording portion, a magnetic disk/tape, or the like, while sound data is sampled for a predetermined period of time before/after the photographic operation. The sampled sound data is temporarily stored in a sound data storage section constituted by a semiconductor memory and the like. In a film wind-up operation, the sound data is written in the magnetic recording portion of the film. With this operation, the predetermined number of frames can be photographed regardless of whether sound data is present or absent. Further, another camera having a sound recording function is disclosed, in which sound around the camera (sound data) at a given time is temporarily stored in a sound data storage section 54, and sound stored during a film wind-up (film advance) operation is stored on a magnetic track of a film.

22 Claims, 16 Drawing Sheets

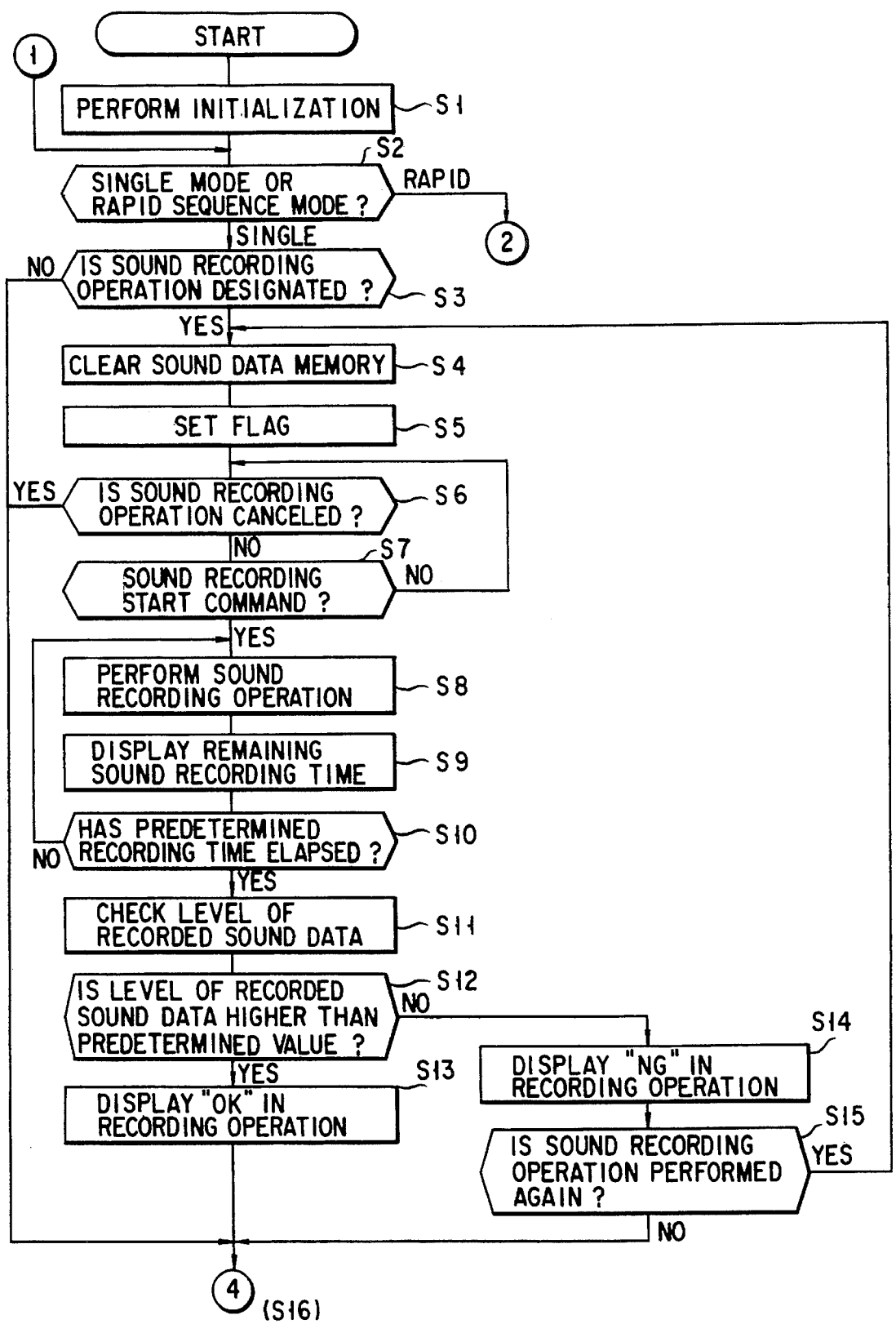
F I G. 4A

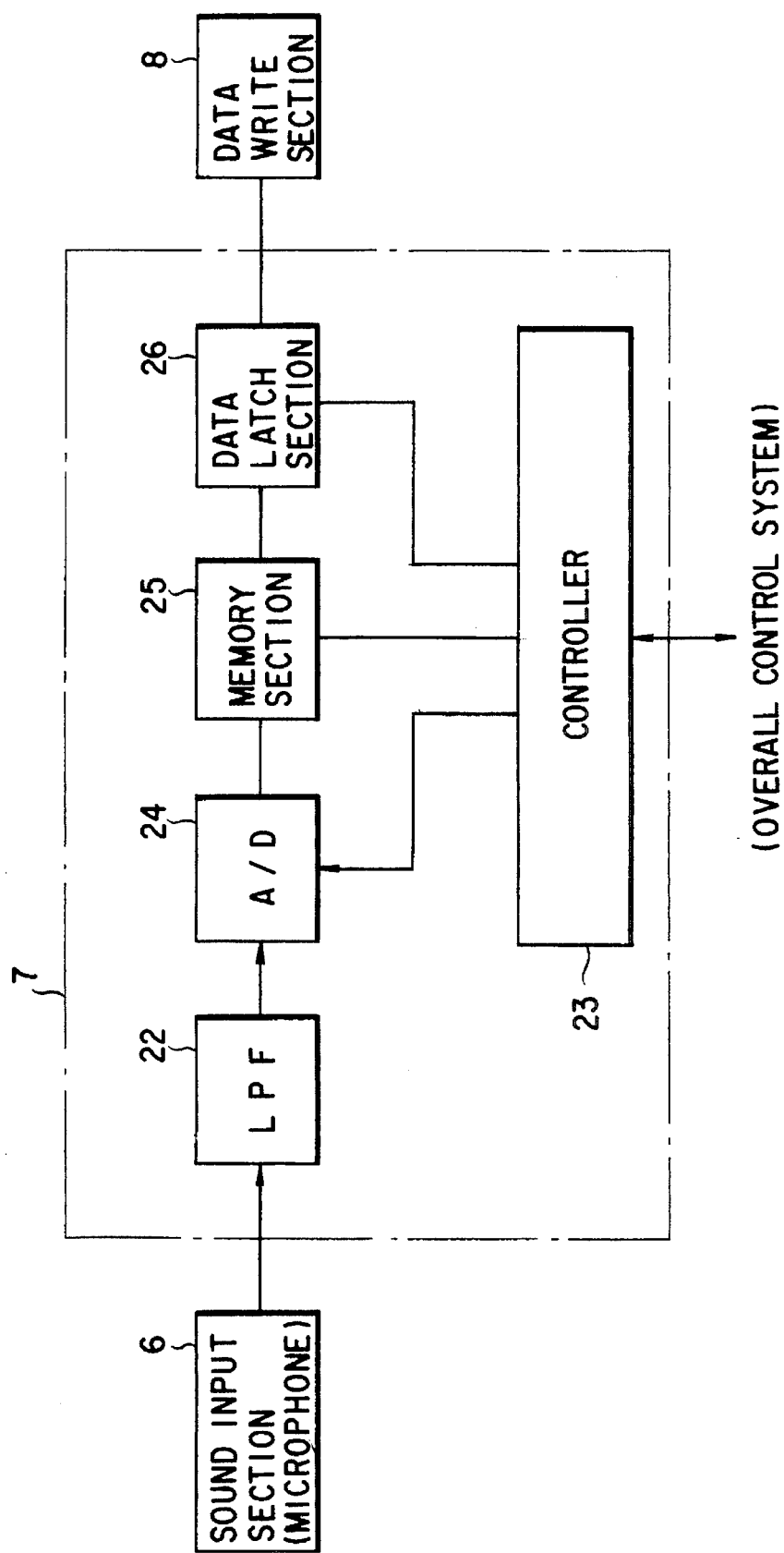
F I G. 5

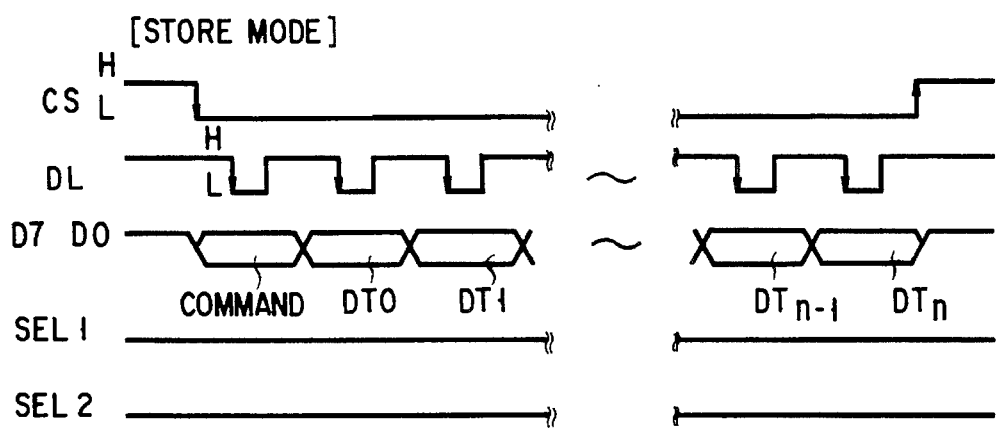
F I G. 9
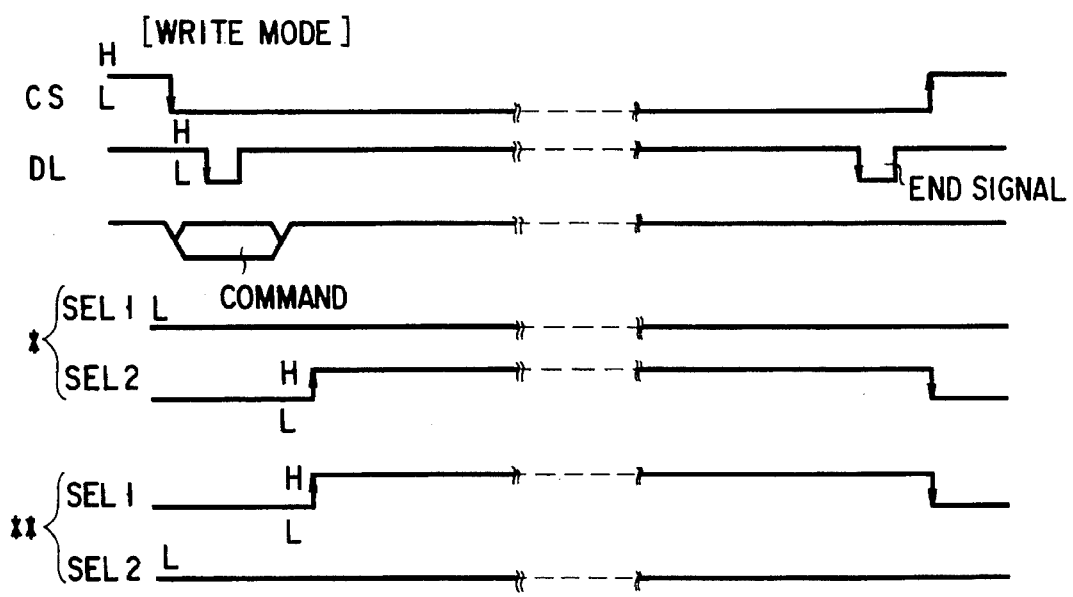
F I G. 10

| NO. | DATA [HEX] | DATA [MEANING] | |
|-----|------------|----------------|---|
| 1 | 50 | P | ⎫ FRAME |
| 2 | 52 | R | ⎬ IDENTIFICATION |
| 3 | 49 | I | ⎭ |
| 4 | 32 | 2 | ⎫ FRAME COUNT |
| 5 | 34 | 4 | ⎭ |
| 6 | 53 | S | ⎫ |
| 7 | 4F | O | ⎪ |
| 8 | 55 | V | ⎬ SOUND DATA IDENTIFICATION |
| 9 | 4E | N | ⎪ |
| 10 | 44 | D | ⎭ |
| 11 | ✕✕ | | ⎫ |
| ⁝ | | | |
| N-2 | ✕✕ | | ⎬ SOUND DATA CONTENTS |
| N-1 | ✕✕ | | |
| N | ✕✕ | | |
| N+1 | ✕✕ | | |
| N+2 | ✕✕ | | ⎭ |

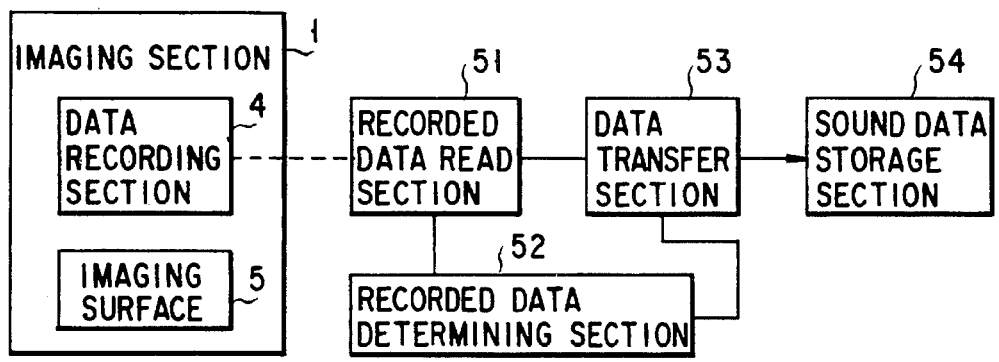
F I G. 13
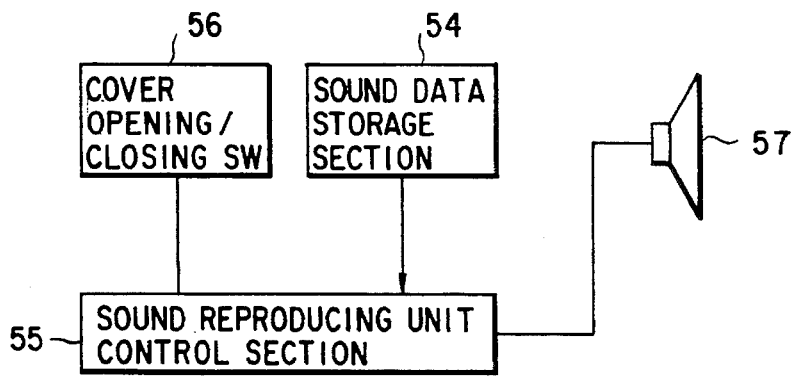
F I G. 14
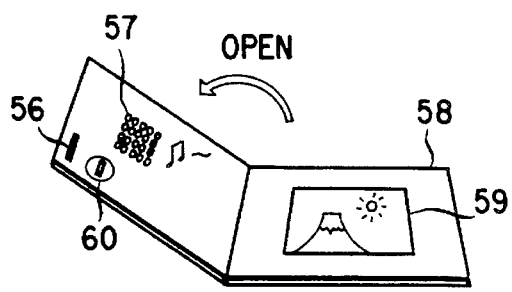
F I G. 15

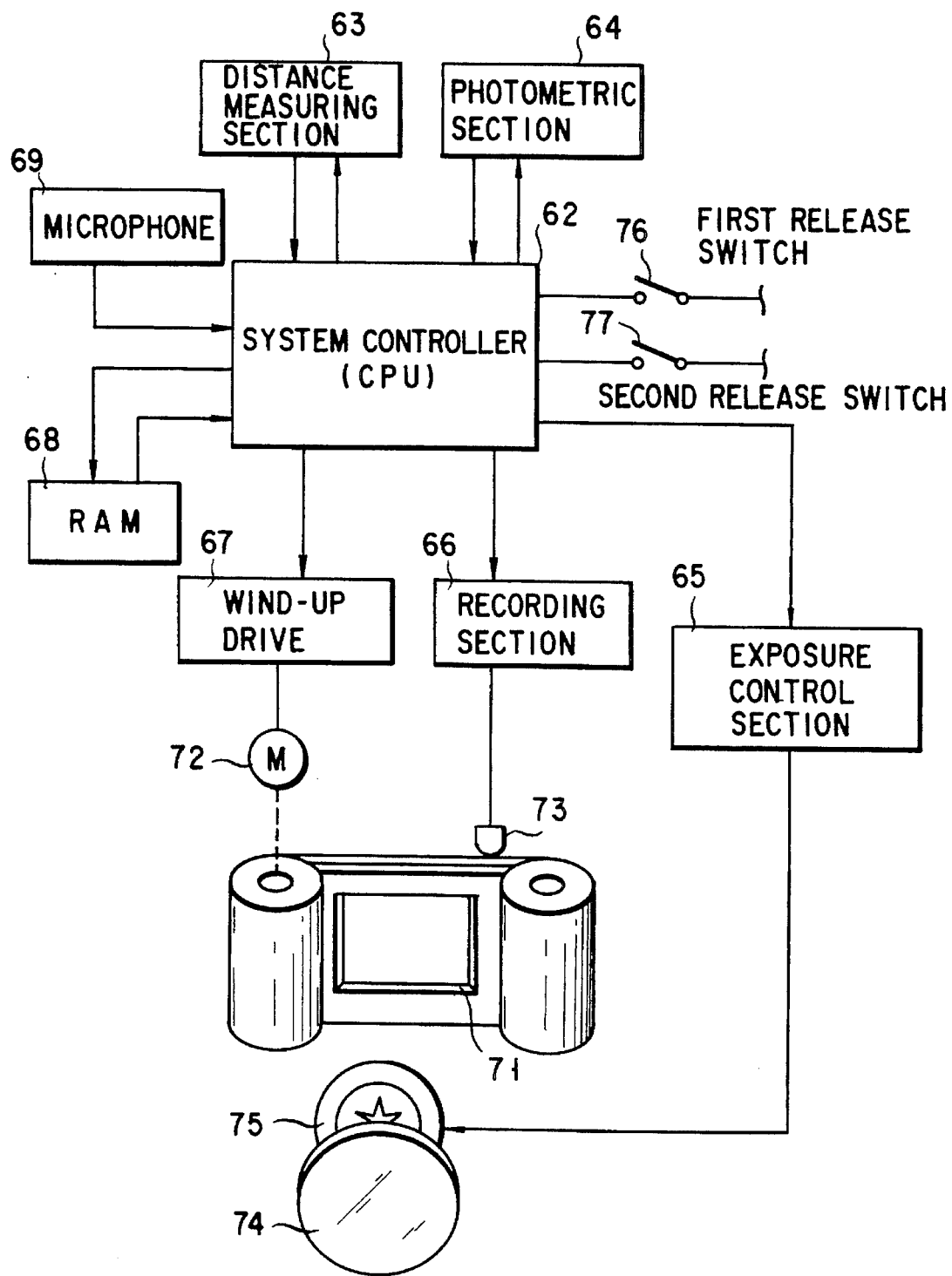
F I G. 16

CAMERA HAVING SOUND RECORDING FUNCTION

This application is a Continuation of application Ser. No. 08/096,488, filed Jul. 22, 1993, now abandoned.

BACKGROUND OF THE INVENTION

1. Field of the Invention

The present invention relates to a camera having a sound recording function, which performs a photographic operation and records photographic data in the photographic operation as sound data.

2. Description of the Related Art

Video cameras (e.g., an 8 mm video camera, a VHS video camera, and a Beta video camera) are generally known as cameras for simultaneously recording continuous images and sounds. Of these video cameras, a video camera has a function of recording/reproducing sound data of a short duration in the reproduction mode while, for example, an image is captured like a still image obtained by still picture photography.

There are also still cameras and the like which can record sounds for a short period of time after an image is photographed as a still image (photograph).

In such a still camera, the timing of a sound recording operation, a recording time display, and the like are defined in accordance with a recording medium. For example, sounds around the camera are recorded by a microphone incorporated in the camera body for about 10 seconds immediately after the shutter button is depressed. Images and sounds are alternately recorded on a recording medium such as a floppy disk.

That is, since either an image or a sound can be recorded, images can be continuously recorded. If no sound is input for a predetermined period of time after a sound recording mode is set, the corresponding track of the floppy dismay be secured as an empty track so that only sounds can be recorded afterward.

The following problems are posed in the above-described video and still cameras capable of reproducing still images.

The above-described video camera is mainly designed to record motion. For this reason, even if the camera is used to perform still picture photography (for still images), and a sound recording operation is performed, a magnetic tape as a recording medium is kept wound up to be consumed.

That is, if a sound recording operation is performed during photography, the magnetic tape is excessively consumed.

In the still camera capable of recording sounds, since image data and sound data are recorded on one recording medium (e.g., a floppy disk) in the same format, the storage capacity varies frame by frame depending on whether a sound recording operation is performed or not and the length of a recording time. As a result, the allowable frame counts of recording media having the same storage capacity differ from each other.

The photographer, therefore, cannot estimate a frame count. In addition, even if a frame count or a remaining frame count is displayed, the photographer cannot know the actual allowable frame count (remaining frame count).

Various cameras for recording photographic data such as sound data on a magnetic recording portion on a film have been proposed.

In the above-described camera, when a film is wound up after exposure of one frame is completed, an external sound input through a microphone is recorded, and the photographic data is recorded on a magnetic portion on the film by a magnetic head at the same time when the film is wound up.

This camera is designed to record a sound and store it on the magnetic recording portion of the film during a film wind-up operation. In this recording scheme, drive noise caused by a film wind-up motor is mixed with sounds to be recorded. Furthermore, the sound recording time is limited below the film wind-up time.

SUMMARY OF THE INVENTION

It is, therefore, an object of the present invention to provide a camera having a sound recording function, in which a predetermined allowable frame count does not change regardless of whether a sound data recording operation is performed in a photographic operation, a sound recording time can be arbitrarily set, and drive noise can be removed.

According to the present invention, there is provided camera having a sound recording function, comprising a camera body allowing a film having a magnetic recording portion to be loaded therein, a manual operation member for outputting a first signal in response to an initial operation and outputting a second signal in response to an operation following the initial operation, sound data storage means for sampling sounds around the camera in response to the first signal and storing the sampled sound data, the sound data storage means including a sound input microphone, a converter for converting the sound data sampled by the microphone into encoded data, and a semiconductor memory for temporarily storing the encoded data, exposure means for executing an exposure operation in response to the second signal, film feed means for winding up the film by one frame upon completion of the exposure operation, and magnetic recording means for reading out the data stored in the semiconductor memory and recording the data on the magnetic recording portion while the film feed means winds up the film by one frame, the magnetic recording means including a magnetic head and a driving circuit for the magnetic head.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out in the appended claims.

BRIEF DESCRIPTION OF THE DRAWINGS

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 4A to 4E are flow charts showing a sound recording operation of the camera in FIG. 1;

FIG. 5 is a block diagram showing the arrangement of a signal processing system for processing input sound data in the camera capable of recording sounds in FIG. 1;

FIG. 9 is a timing chart of a store mode (communication);

FIG. 10 is a timing chart of a write mode (communication);

FIG. 13 is a block diagram showing the arrangement of a recorded sound data read system of the camera having a sound recording unit according to the embodiment;

FIG. 14 is a block diagram showing the arrangement of a sound reproducing unit for extracting sound data from the camera having the sound recording unit according to the embodiment;

FIG. 15 is a perspective view showing the outer appearance of an album type sound reproducing unit as the sound reproducing unit shown in FIG. 14;

FIG. 16 is a block diagram showing the schematic arrangement of a camera according to the second embodiment of the present invention.

DETAILED DESCRIPTION OF THE PREFERRED EMBODIMENTS

Embodiments of the present invention will be described in detail below with reference to the accompanying drawings.

Figure 1:
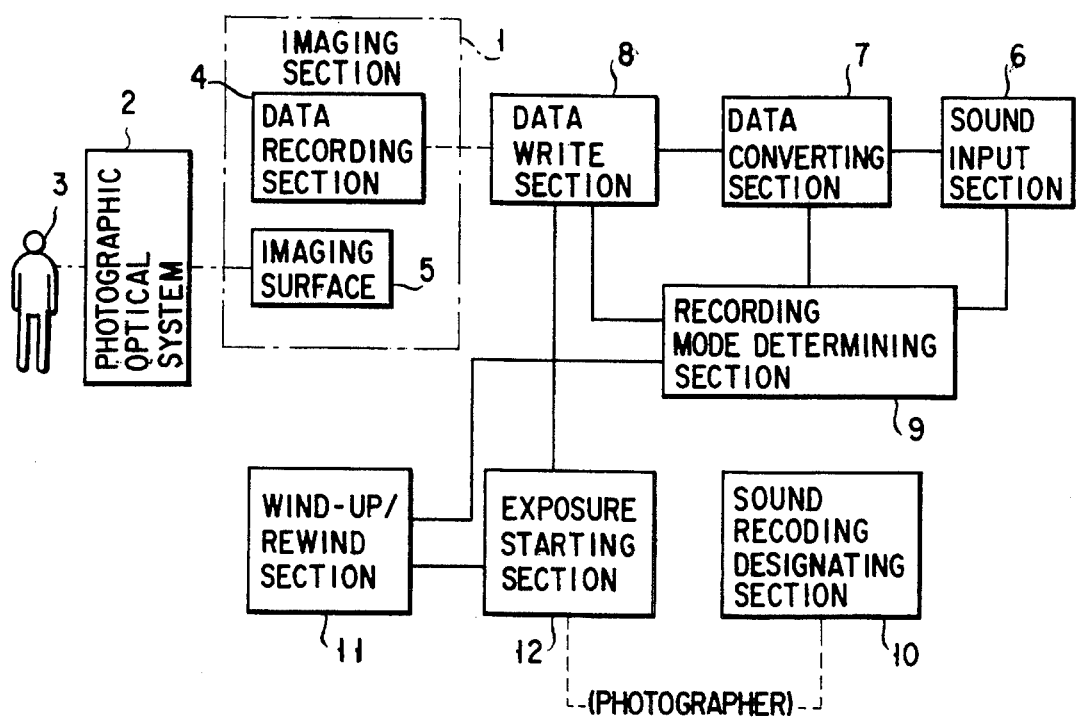
FIG. 1 is a block diagram showing the schematic arrangement of a camera according to the first embodiment of the present invention.

FIG. 1 shows the schematic arrangement of a camera according to the present invention.

In this camera, an imaging section 1 images an object image 3 formed by a photographic optical system 2 constituted by a lens barrel and the like. The imaging section 1 includes a data recording section 4 for sampling and recording data such as sound data, and an imaging surface 5 for receiving a formed object image as light. As a recording medium used for the camera of this embodiment to record image and sound data, the following may be used: a film obtained by forming a magnetic track (magnetic recording portion) on part (e.g., the lower surface) of a silver salt film, a floppy disk (or a magnetic tape) for recording an electrical signal (or magnetic signal) obtained by a photoelectric conversion element such as a CCD arranged at the imaging surface 5, or the like.

Sound data to be recorded on a magnetic track is input through a sound input section 6 such as a microphone, converted into digital data by a data converting section 7, and input by the data recording section 4 through a data write section 8.

The data write section 8, the data converting section 7, and the sound input section 6 are connected to a recording mode determining section 9. When a sound recording operation is designated by a sound recording designating section 10, the recording mode determining section 9 sends operation commands to the abovementioned three components.

The recording mode determining section 9 is connected to a wind-up/rewind section 11 and designates a wind-up/rewind operation of the imaging section 1 to perform a sound data recording operation in accordance with a photographic mode of the camera. An exposure starting section 12 generates a start signal for starting a photographic operation of the camera.

The exposure starting section 12 is connected to the data write section 8 and the wind-up/rewind section 11 to generate start signals for starting a wind-up operation of the imaging section 1 upon completion of exposure and a sound data write operation of the data write section 8.

Figure 2:
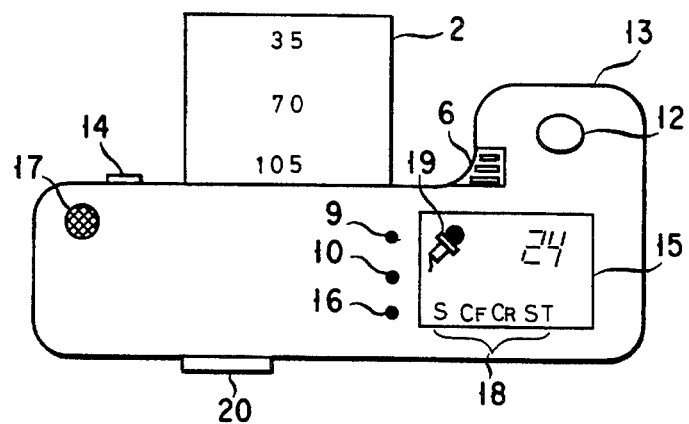
FIG. 2 is a view showing the outer appearance of the camera capable of recording sounds when viewed from the upper surface of the camera.

FIG. 2 shows the outer appearance of the camera (FIG. 1) capable of recording sounds when viewed from the upper surface.

According to this camera, the photographic optical system 2 constituted by a photographic lens having a zooming function, the sound input section (microphone) 6, and an LED 14 are arranged on the front surface of a camera body 13. On the upper surface of the camera body 13, the following components are arranged: the exposure starting section (release switch) 12, an LCD 15 for displaying a photographic mode, the recording mode determining section 9, the sound recording designating section 10, a photographic mode selecting section 16, and an alarm section 17. On the LCD 15, a photographic mode display portion 18 and a sound recording mode display portion 19 indicating the presence/absence of sound data and a sound recording mode are displayed. A finder 20 is arranged on the rear surface of the camera body 13.

Figure 3A:
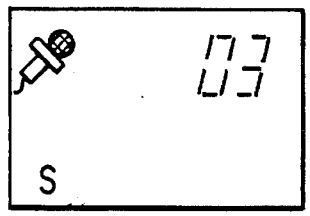
FIG. 3A to 3J are views respectively showing display samples of photographic modes and sound recording modes displayed on an LCD in FIG. 2.
Figure 3B:
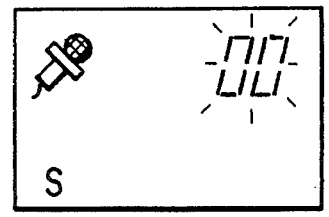
Figure 3C:
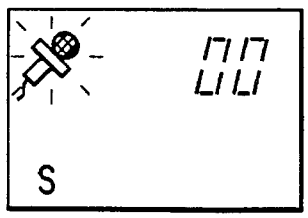
Figure 3D:
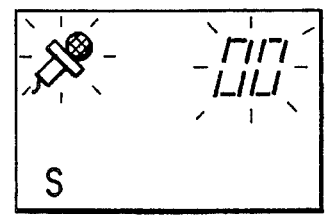
Figure 3E:
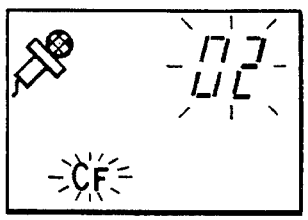
Figure 3F:
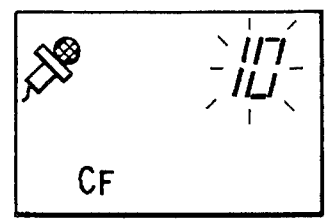
Figure 3G:
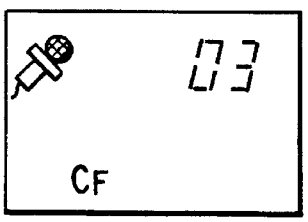
Figure 3H:
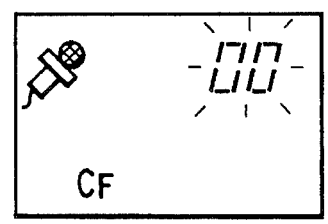
Figure 3I:
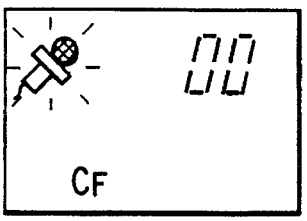
Figure 3J:
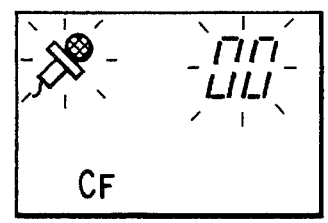

FIGS. 3A to 3J show display samples of photographic modes and sound recording modes displayed on the LCD 15. FIG. 3A shows a display sample indicating a remaining sound recording time. FIG. 3B shows a display sample indicating the end of a sound recording operation by flickering "00". FIG. 3C shows a display sample indicating "OK" in a recording operation. FIG. 3D shows a display sample indicating "NG" in a recording operation. FIG. 3E is a display sample indicating a rapid sequence mode "C". FIG. 3F shows a display sample indicating an allowable recording time. FIG. 3G shows a display sample indicating a remaining sound recording time. FIG. 3H shows a display sample indicating the end of a sound recording operation by flickering "00". FIG. 3I shows a display sample indicating "OK" in a sound recording operation with a sufficient volume. FIG. 3J is a display sample indicating "NG" in a sound recording operation with a sound level lower than a predetermined volume.

A sound recording operation of the camera of the embodiment will be described below with reference to FIGS. 4A to 4E. The same reference numerals in the following description denote the same parts as in FIGS. 1 and 2.

First, initialization of the camera is performed (step S1).

It is then checked whether the photographic mode of the camera is the single mode or the rapid sequence mode (step S2). In this case, the mode selected by the photographic mode selecting section 16 is determined. If the photographic mode is the rapid sequence mode (RAPID), the flow advances to step S51 (to be described later). If the photographic mode is the single mode (SINGLE), it is checked whether a sound recording operation is designated (step S3).

This designation of a sound recording operation is performed by the sound recording designating section 10. If a sound recording operation is not designated (NO), the flow advances to step S16. If the sound recording operation is designated (YES), the sound recording mode display portion 19 displays the sound recording mode.

A memory in which sound data is to recorded is cleared (step S4), and a flag representing "a sound recording operation in the single mode" is set (step S5). This flat is used for branch determination.

Subsequently, it is checked whether the designation of the sound recording operation is canceled (step S6). If it is determined that the sound recording designating section 10 is operated to issue a stop command for canceling the sound recording operation (YES), the flow advances to step S16. If no stop command for canceling the sound recording operation is issued (NO), it is checked whether a command signal for starting the recording operation is issued (step S7). In this case, for example, the recording operation may be started by operating the exposure starting section 12.

If it is determined in step S7 that no recording operation start signal is issued (NO), the flow returns to step S6. If it is determined in step S7 that a recording operation start signal is issued (YES), a sound recording operation is started by the sound input section (microphone) 6 (step S8).

The remaining sound recording time is displayed on the LCD 15, as shown in FIG. 3A (step S9). It is then checked whether a predetermined recording time has elapsed (step S10). If the predetermined recording time has not elapsed (NO), the flow returns to step S8. If the predetermined recording time has elapsed (YES), "00" is flickered to indicate the end of the sound recording operation, as shown in FIG. 3B. In addition, after an alarm sound is generated by the alarm section 17, the sound level of the recorded data is checked (step S11).

After the data sound level is checked, it is checked whether the volume of the recorded data is too low to clearly hear the reproduced sound, i.e., whether the volume is higher than a predetermined volume (step S12). If it is determined that the volume of the recorded data is higher than the predetermined volume (YES), "OK" in the recording operation is displayed in the form shown in FIG. 3C (step S13). After "OK" is flickered for a predetermined period of time, the flow advances to step S16.

If it is determined in step S12 that the level of the recorded data is lower than the predetermined volume (NO), "NG" in the recording operation is displayed in the form shown in FIG. 3D (step S14). In order to more emphatically notify the photographer of the failure, an alarm sound may be generated by the alarm section 17.

It is then checked whether a sound recording operation is performed again (step S15). If the operation is performed again (YES), the sound recording designating section 10 is operated to return to step S4, thus performing the sound recording operation again. If the sound recording operation is not performed (NO), the flow advances to step S16.

Figure 4B:
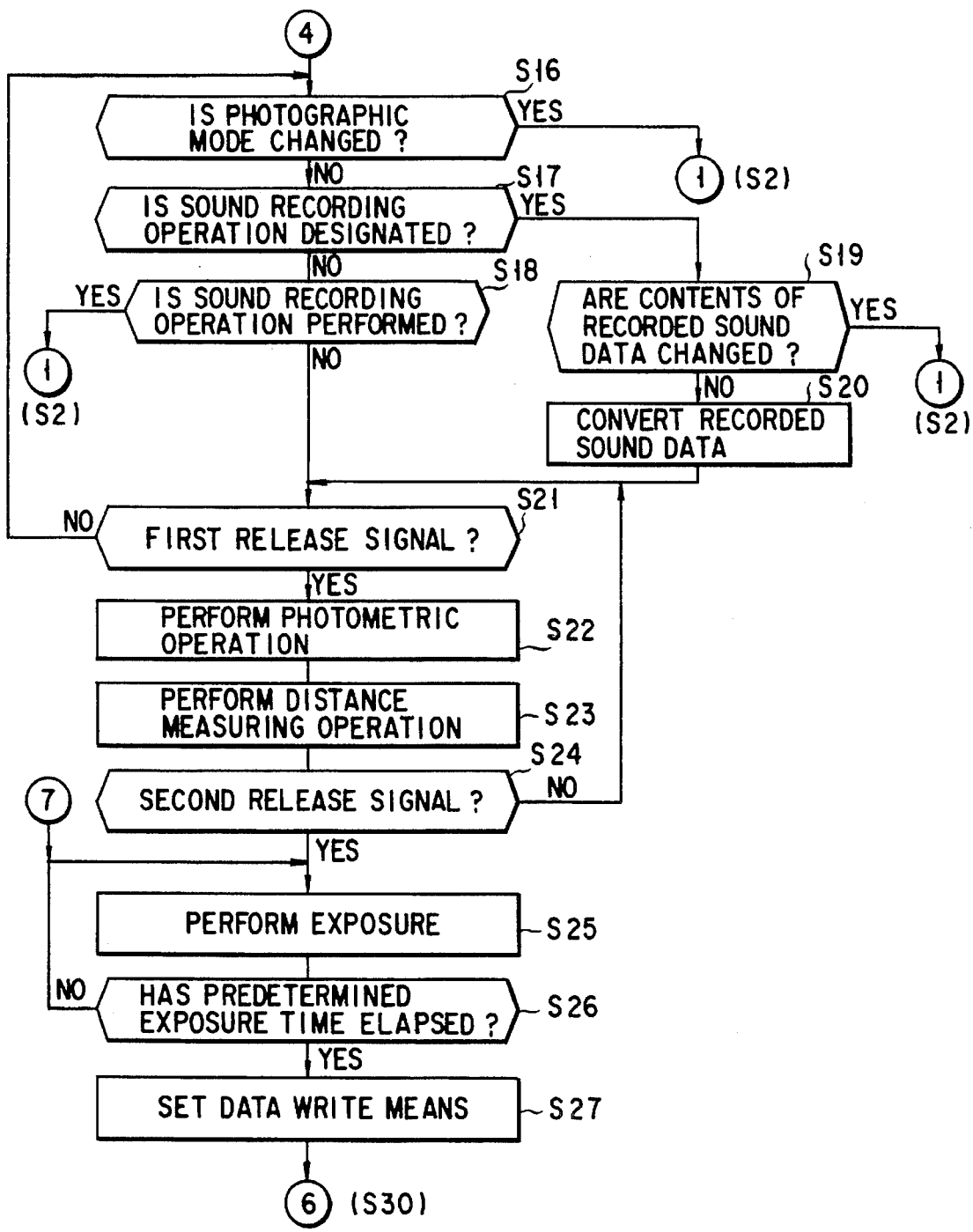

The flow advances to step S16 shown in FIG. 4B to check whether the photographic mode is changed. If a change in photographic mode, e.g., from the single mode to the rapid sequence mode, or from the rapid sequence mode to the single mode, is designated (YES), the flow returns to step S2 because the allowable recording time changes. If no change in photographic mode is designated (NO), it is checked whether a sound recording operation is designated, as in step S3 (step S17).

If it is determined that no sound recording operation is designated (NO), it is checked whether a sound recording operation is newly designated (step S18). If a sound recording operation is newly designated (YES), the flow returns to step S2. If a sound recording operation is not newly designated (NO), the flow advances to step S21.

If it is determined in step S17 that the sound recording operation is designated (YES), it is checked whether the contents of recorded data are to be changed (step S19). If the recording mode determining section 9 is operated to change the contents of the recorded data (YES), the flow returns to step S2 to perform the sound recording operation again. If no change is to be made in the contents of the recorded data (NO), the recorded sound data is converted to be recorded by the data recording section 4 of the imaging section 1 (step S20). This data conversion will be described later.

Subsequently, it is checked whether a first release signal is output from the exposure starting section 12 (step S21). If it is determined that the first release signal is not input (NO), the flow returns to step S16 to repeat the above-described decision steps to wait until the first release signal is input. If a new decision is made in association with a sound recording operation in this repetition of decision steps, e.g., YES is obtained in the step of checking whether the contents of recorded data are to be changed, an operation is naturally performed in accordance with the decision.

If it is determined in step S21 that the first release signal is input (YES), a photometric operation of the camera (step S22) and a distance measuring operation (step S23) are performed. It is then checked whether a second release signal is input (step S24). If the second release signal is not input (NO), the flow returns to step S21 to wait until the second release signal is input. If the second release signal is input (YES), exposure is performed (step S25), and it is checked whether a predetermined exposure time has elapsed (step S26).

If it is determined that the predetermined exposure time has not elapsed (NO), the flow returns to step S25. If the predetermined exposure time has elapsed, and exposure is completed (YES), setting (preparation) of the data write section 8 for recording sound data by using the data recording section 4 of the imaging section 1 is performed (step S27), and the flow advances to step S30 in FIG. 4C.

In step S30, a film wind-up operation is started. The timings of sound data differ depending on whether the single mode or the rapid sequence mode is set as a photographic mode. Therefore, it is checked which photographic mode is set (step S31). If it is determined that the single mode is set (SINGLE), sound data is recorded while a film wind-up operation is performed (step S32). It is checked whether the film wind-up operation is completed (step S33). In this case, sound data is recorded while a film wind-up operation is performed. For this reason, when the film wind-up operation is completed, it can be considered that recording of the sound data is completed. That is, if the film wind-up operation is not completed (NO), the flow returns to step S32. If the film wind-up operation is completed (YES), the flow advances to step S38.

If it is determined in step S31 that the photographic mode is the rapid sequence mode (RAPID), it is checked whether the sound recording timing is a timing before or after a rapid sequence operation (step S34).

The sound recording timing in the rapid sequence mode is different from that in the single mode. In this embodiment, as described above, a sound recording timing can be selected from two timings, i.e., the timing before a photographic operation or the timing after a photographic operation. If, therefore, a recording operation is to be performed after a rapid sequence operation (AFTER), sound data is not recorded during a photographic operation, but recording is performed until a film wind-up operation is completed (step S35). When the film wind-up operation is completed, the flow advances to step S38.

If it is determined in step S34 that a sound recording operation is performed before a photographic operation (BEFORE), sound data, of the already recorded sound data, which corresponds to a sound recording time corresponding to one frame is recorded (step S36). Thereafter, it is checked whether the film wind-up operation is completed (step S37). When the sound data is recorded, and the film wind-up operation is completed, the flow advances to step S38.

In step S38, it is checked whether the photographic mode is the single mode or the rapid sequence mode.

If it is determined that the photographic mode is the single mode (SINGLE), since photography, a sound data recording operation, and a film wind-up operation are completed, the flow advances to step S45.

If it is determined in step S38 that the photographic mode is the rapid sequence mode (RAPID), the rapid sequence frame count is incremented in order to obtain data indicating the number of frames which have already been photographed since the rapid sequence operation was started (step S39).

It is then checked whether the sound recording timing is before or after the rapid sequence operation (step S40). If it is determined that the sound recording operation is performed before the rapid sequence operation (BEFORE), it is checked whether the rapid sequence frame count has reached a predetermined frame count (step S41). Note that a recording operation before a photographic operation in this rapid sequence mode will be described below.

If it is determined in step S41 that the rapid sequence frame count has reached the predetermined frame count (YES), the flow advances to step S45. Otherwise (NO in step S41), all the sound data recorded before the rapid sequence operation may not be recorded by the data recording section 4 of the imaging section 1.

It is, therefore, checked whether the second release signal is input (step S42). If it is determined that the second release signal is input (YES), the flow returns to step S25 to continuously perform photography and exposure. If no second release signal is input (NO), the rapid sequence operation is stopped. In this case, as described above, the rapid sequence frame count has not reached the predetermined frame count, it is probable that all the sound data recorded before the rapid sequence operation cannot be recorded by the data recording section 4 of the imaging section 1.

Figure 4C:
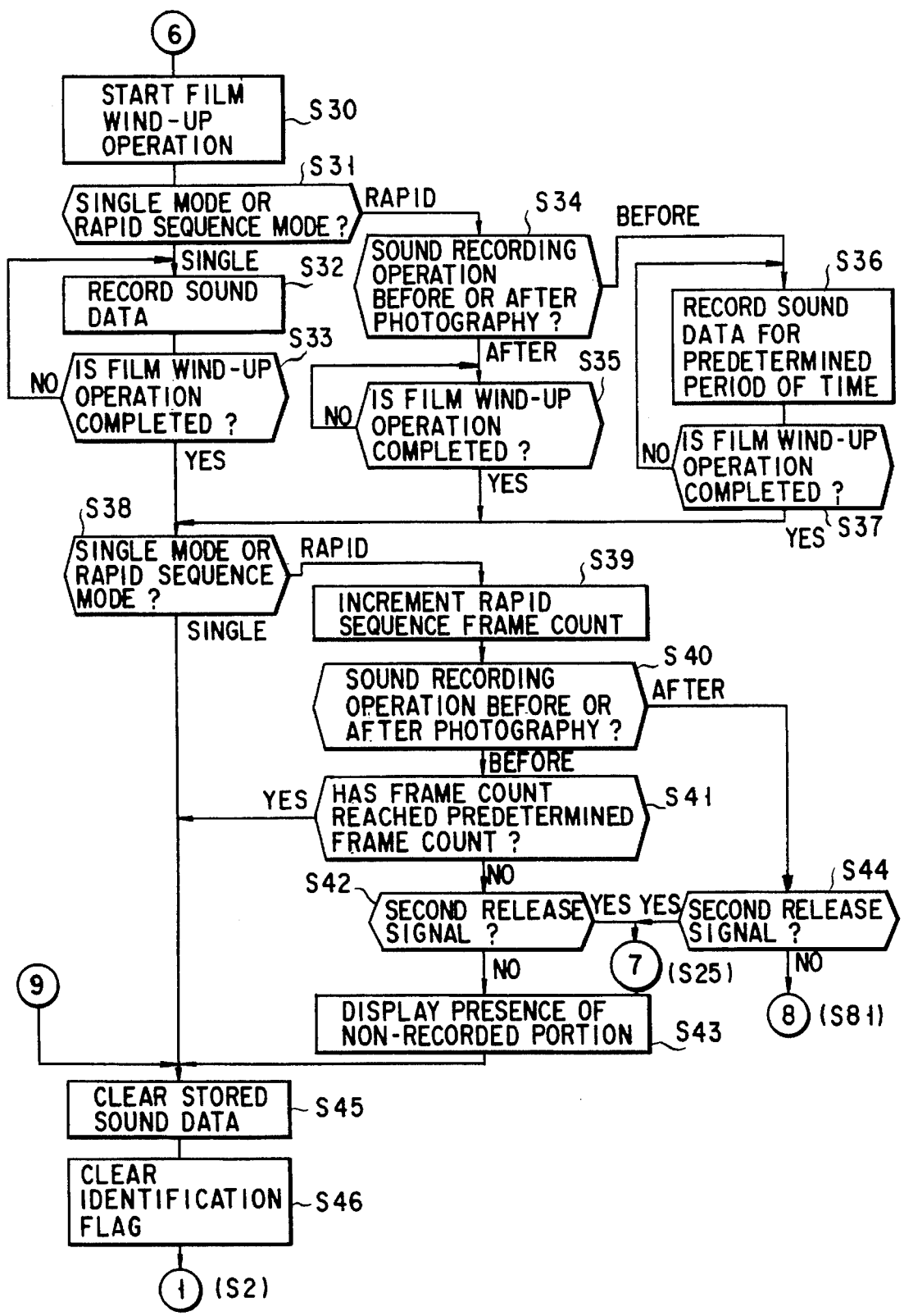
Figure 4D:
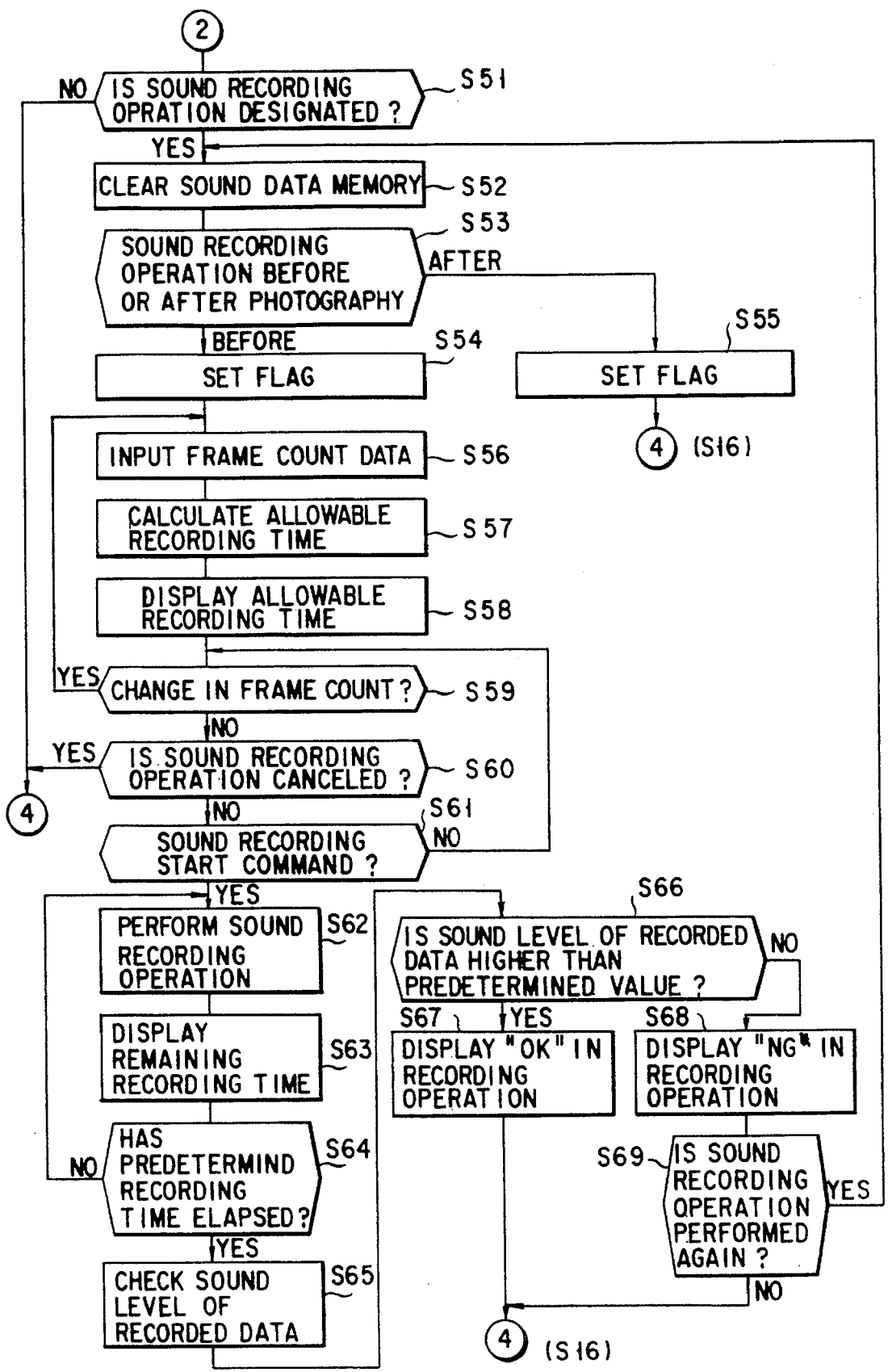
Figure 4E:
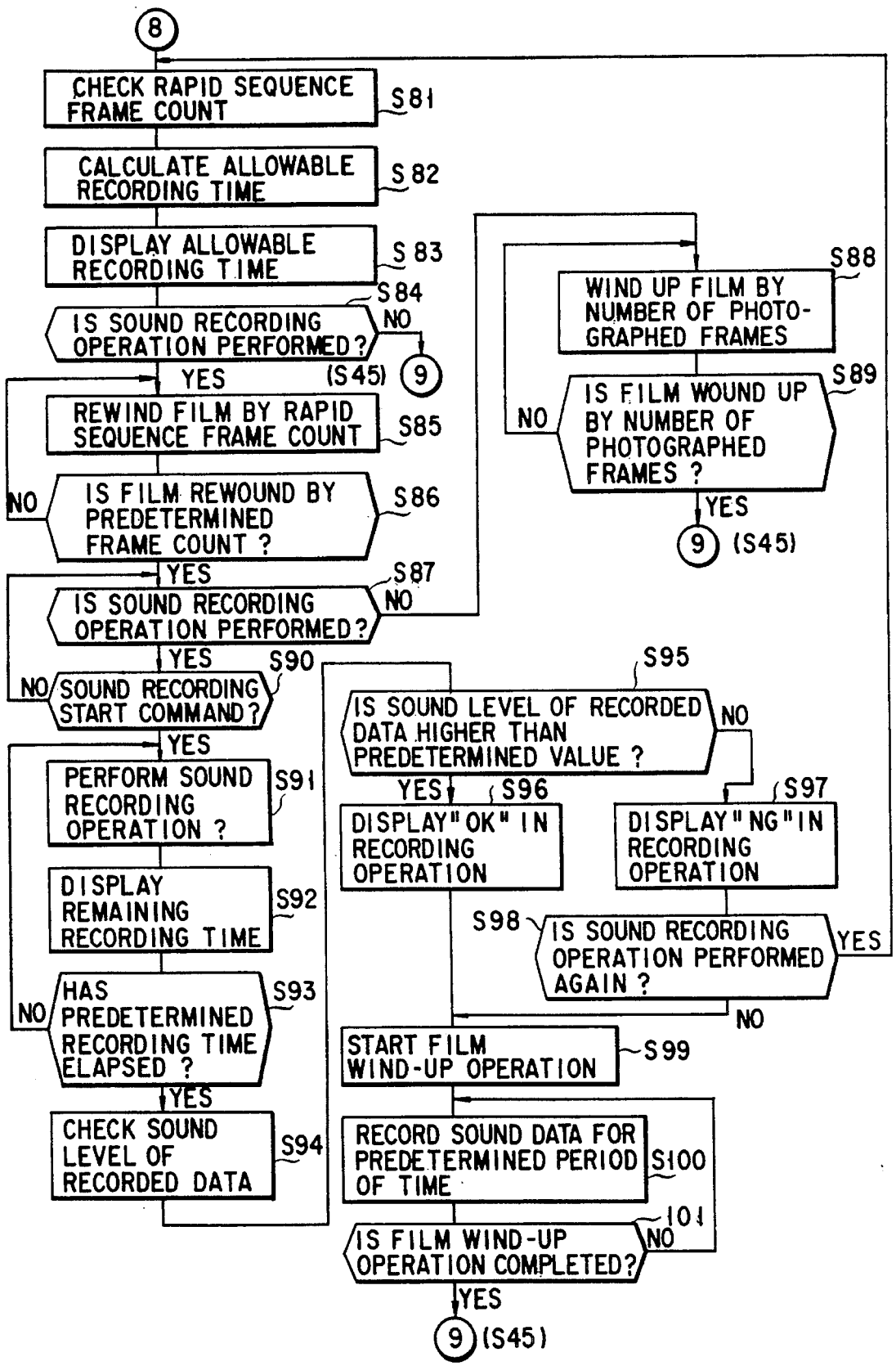

For this reason, if the second release signal is not input, "C" indicating the rapid sequence mode shown in FIG. 4E is displayed, and the difference between the predetermined frame count and the rapid sequence frame count is displayed in order to notify the photographer of the presence of a non-recorded portion of the recorded sound data (step S43). Thereafter, the flow advances to step S45.

If it is determined in step S40 that a sound recording operation is performed after a photographic operation (AFTER), it is checked whether the second release signal is input (step S44), similar to the above operation. If it is determined that the second release signal is input (YES), the flow returns to step S25 to continuously perform photography and exposure. Otherwise (NO in step S44), the flow advances to step S81.

In step S45, the sound data recorded in single mode photography or recorded before a photographic operation in the rapid sequence mode is cleared. The identification flag of the photographic mode is cleared (step S46), and the flow returns to step S2 to perform decision steps, e.g., steps of checking a photographic mode and checking whether to perform a sound recording operation.

Assume that the flow returns to step S2 in FIG. 4A, and it is determined that the photographic mode is the rapid sequence mode. Processing to be performed in this case will be described below with reference to step S51 and the subsequent steps shown in FIG. 4D.

In step S51, it is checked whether a sound recording operation is designated. Similar to step S3, a sound recording operation is designated by the sound recording designating section 10. If it is determined that a sound recording operation is not designated (NO), the flow returns to step S16. If a sound recording operation is designated (YES), a memory in which sound data is to be recorded is cleared (step S52).

It is then checked whether a sound recording operation is performed before or after a rapid sequence operation (step S53). This operation is performed by the recording mode determining section 9 ("CF" indicating a recording operation before photography or "CR" indicating a recording operation after photography). If a recording operation after photography is determined (AFTER), a flag indicating "a recording operation after photography in the rapid sequence mode" is set (step S55) and is used in the subsequent branch decision. Thereafter, the flow returns to step S16.

If it is determined in step S53 that a recording operation is performed before photography (BEFORE), a flag indicating "a recording operation before photography in rapid sequence mode" is set (step S54), and a frame count in the rapid sequence operation is input (step S56). More specifically, a frame count is input by using a telephoto/wide-angle switch (not shown) or the like for changing the focal length.

An allowable recording time is calculated on the basis of the input rapid sequence frame count (step S57).

The allowable recording time is determined by multiplying a sound recording time allowed for one frame by an estimated rapid sequence frame count. The allowable recording time is displayed in the form shown in FIG. 3F (step S58).

It is checked whether the rapid sequence frame count is changed (step S59). If it is determined that the rapid sequence frame count is changed (YES), the flow returns to step S56. If no change is made (NO), it is checked whether the sound recording operation is canceled (step S60).

If it is determined in step S60 that the sound recording designating section 10 is operated to cancel the sound recording operation (YES), the flow returns to step S16. If the sound recording operation is not canceled (NO), it is checked whether a sound recording start command is issued (step S61).

This sound recording start command is issued by operating the exposure starting section 12. If it is determined that no sound recording start command is issued (NO), the flow returns to step S59. If a sound recording start command is issued (YES), a sound recording operation is started by the sound input section (microphone) 6 (step S62). The remaining sound recording time is then displayed in the form shown in FIG. 3G (step S63).

It is checked whether a predetermined recording time has elapsed (step S64). It is determined that the predetermined recording time has not elapsed (NO), the flow returns to step S62. If it is determined that the predetermined recording time has elapsed (YES), "00" is flickered to inform the photographer of the end of the sound recording operation, as shown in FIG. 3H, and an alarm sound is generated by the alarm section 17.

The sound level of the recorded data is checked (step S65). It is checked whether the checked data sound level is higher than a predetermined volume (predetermined value) (step S66). In this decision step, it is checked whether the volume of the recorded data is lower than the predetermined volume, and the reproduced sound can be clearly heard.

If it is determined that the sound recording level is higher than the predetermined volume, and the sound data is recorded with a sufficient volume (YES), "OK" in the recording operation is displayed in the form shown in FIG. 3I (step S67). After "OK" in the recording operation is flickered for a predetermined period of time, the flow returns to step S16. If the sound recording level is lower than the predetermined value (NO), "NG" in the recording operation is displayed in the form shown in FIG. 3J (step S68).

In this case, an alarm sound may be generated by the alarm section 17 to more emphatically notify the photographer of the above information.

It is then checked whether the sound recording operation is to be performed again (step S69). If it is determined that the sound recording operation is performed again (YES), the sound recording designating section 10 is operated to return to step S52 so as to perform the sound recording operation again. If the sound recording operation is not performed again (NO), the flow advances to step S16.

Assume that it is determined in step S44 that no second release signal is input in a recording operation after photography in the rapid sequence mode (NO). Processing to be performed in this case will be described below with reference to step S81 and the subsequent steps shown in FIG. 4E.

In step S81, the rapid sequence frame count data incremented in step S39 in FIG. 4C is checked.

An allowable recording time is calculated from the rapid sequence frame count (step S82), similar to step S57. The allowable recording time is displayed (step S83).

Similar to step S58 described above, the allowable recording time is displayed in the form shown in FIG. 3F. In this case, since a recording operation after photography in the rapid sequence mode is set, "CR" is displayed instead of "CF".

Since a recording operation after photography is set, a film must be rewound to a rapid sequence start frame in order to actually perform a sound recording operation. For this reason, it is checked whether to perform a sound recording operation (step S84). If the sound recording designating section 10 is operated (YES), it is determined that a sound recording operation is performed, and the film is rewound by an amount corresponding to a rapid sequence frame count (step S85). If the camera is operated somehow to indicate that no sound recording operation is performed (NO), the flow returns to step S45 in FIG. 4C, thus terminating the sequence.

In step S85 where the film is rewound by the amount corresponding to the rapid sequence frame count, for example, the number of frames which are rewound may be checked by detecting the perforations of the film (not shown) using a photointerrupter.

It is then checked whether rewinding of the film by a predetermined frame count is completed (step S86). If the film rewind operation is not completed (NO), the flow returns to step S85 to continuously perform the film rewind operation by the predetermined frame count. If the film rewind operation by the predetermined frame count is completed (YES), it is checked whether a sound recording operation is performed again (step S87). If the sound recording operation is to be stopped or the camera is operated somehow to indicate that the sound recording operation is stopped after the film is rewound by the predetermined frame count to perform the sound recording operation (NO), the film, which has been rewound by the predetermined frame count to perform the sound recording operation, is wound up (step S88). It is then checked whether the film wind-up operation is completed (step S89). This decision is made until the film wind-up operation is completed. If the film wind-up operation is completed (YES), the flow returns to step S45 in FIG. 4C to terminate the sequence.

If it is determined in step S87 that the sound recording designating section 10 is operated to perform a sound recording operation (YES), it is checked whether a recording start command is input (step S90).

As described above, in this decision step, for example, a recording start command is issued by operating the exposure starting section 12. If the recording start command (signal) is not input (NO), the flow returns to step S87. If the recording start command is input (YES), a sound recording operation is started by the sound input section (microphone) 6 (step S91).

The remaining sound recording time in the form shown in FIG. 3G is displayed (step S92). In this case, the remaining sound recording time is displayed in the form shown in FIG. 3G. In this case, since a recording operation after photography in the rapid sequence mode is set, "CR" is displayed.

It is checked whether a predetermined recording time has elapsed. If it is determined that the predetermined recording time has not elapsed (NO), the flow returns to step S91. If the predetermined recording time has elapsed (YES), "00" is flickered, as shown in FIG. 3H, to notify the photographer of the end of the sound recording operation. The flow advances to step S94. In this case, "CR" is displayed. In addition, an alarm sound is generated by the alarm section 17.

After the sound level of the recorded data is checked in step S94, it is checked whether the sound level is higher than a predetermined value (step S95). In this step, it is checked whether the sound level is lower than the predetermined volume, and the reproduced sound is not clearly heard. It is determined that data is recorded with a sufficient volume, and the sound level is higher than the predetermined volume (YES), "OK" in the recording operation is displayed in the form shown in FIG. 3I (step S96). In this case, since a recording operation after photography in the rapid sequence mode is set, "CR" is displayed. After "OK" in the recording operation is flickered for a predetermined period of time, the flow advances to step S99.

If it is determined in step S95 that the sound level of the recorded data is lower than the predetermined volume (NO), "NG" in the recording operation is displayed in the form shown in FIG. 3J (step S97). Since a recording operation after photography in the rapid sequence mode is set, "CR" is displayed. In order to more emphatically notify the photographer of the above information, an alarm sound may be generated by the alarm section 17.

Subsequently, it is checked whether a sound recording operation is performed again (step S98). If the sound recording operation is performed again (YES), the sound recording designating section 10 is operated to return to step S81 to perform the sound recording operation again. If the sound recording operation is not performed again (NO), a film wind-up operation is started to record the recorded sound data by using the data recording section 4 of the imaging section 1 (step S99).

Recording of sound data corresponding to a sound recording time for one frame of the film is performed (step S100). It is checked whether all the recorded sound data are recorded by the data recording section 4 while the film wind-up operation is performed (step S101). If it is determined that the recording operation is not completed yet (NO), the flow returns to step S100 to continuously record sound data corresponding to the sound recording time for one frame of the film. If all the data are recorded by the data recording section 4 (YES), the flow returns to step S45 to terminal the sequence.

With the above-described series of operations, sound data can be recorded in accordance with the photographic mode (the single mode or the rapid sequence mode) of the camera, and notification can be made to the photographer in accordance with conditions.

The electric/magnetic arrangement of recorded sound data and the contents/meanings of data to be processed in the embodiment will be described next with reference to FIGS. 5 to 11.

FIG. 5 shows the arrangement of a signal processing system, of the components shown in FIG. 1, which is designed to process input sound data.

This signal processing system comprises the sound input section 6 constituted by a microphone, the data converting section 7, and the data write section 8 constituted by a magnetic head.

In the data converting section 7, a sound data signal input through the sound input section 6 is input to a low-pass filter (LPF) 22, in which high-frequency components as noise are removed from the sound data signal. The resultant signal is A/D-converted by an A/D converting section 24 at a predetermined timing corresponding to control performed by a controller 23.

The controller 23 is connected to the overall control system of the camera. The digital sound data signals are sequentially stored in a memory section 25. Sound data is loaded into the controller 23 until a predetermined recording time elapses.

After the loading of sound data is completed, the sound data stored in the memory section 25 is latched by a data latch section 26. As described above, the latched data is recorded by the data recording section 4 of the imaging section 1 during a film wind-up operation.

The data latched in synchronism with the film wind-up timing is recorded, as sound data, from the data recording section 4 onto a magnetic track (to be described later) through the data write section 8 (magnetic head).

Figure 6:
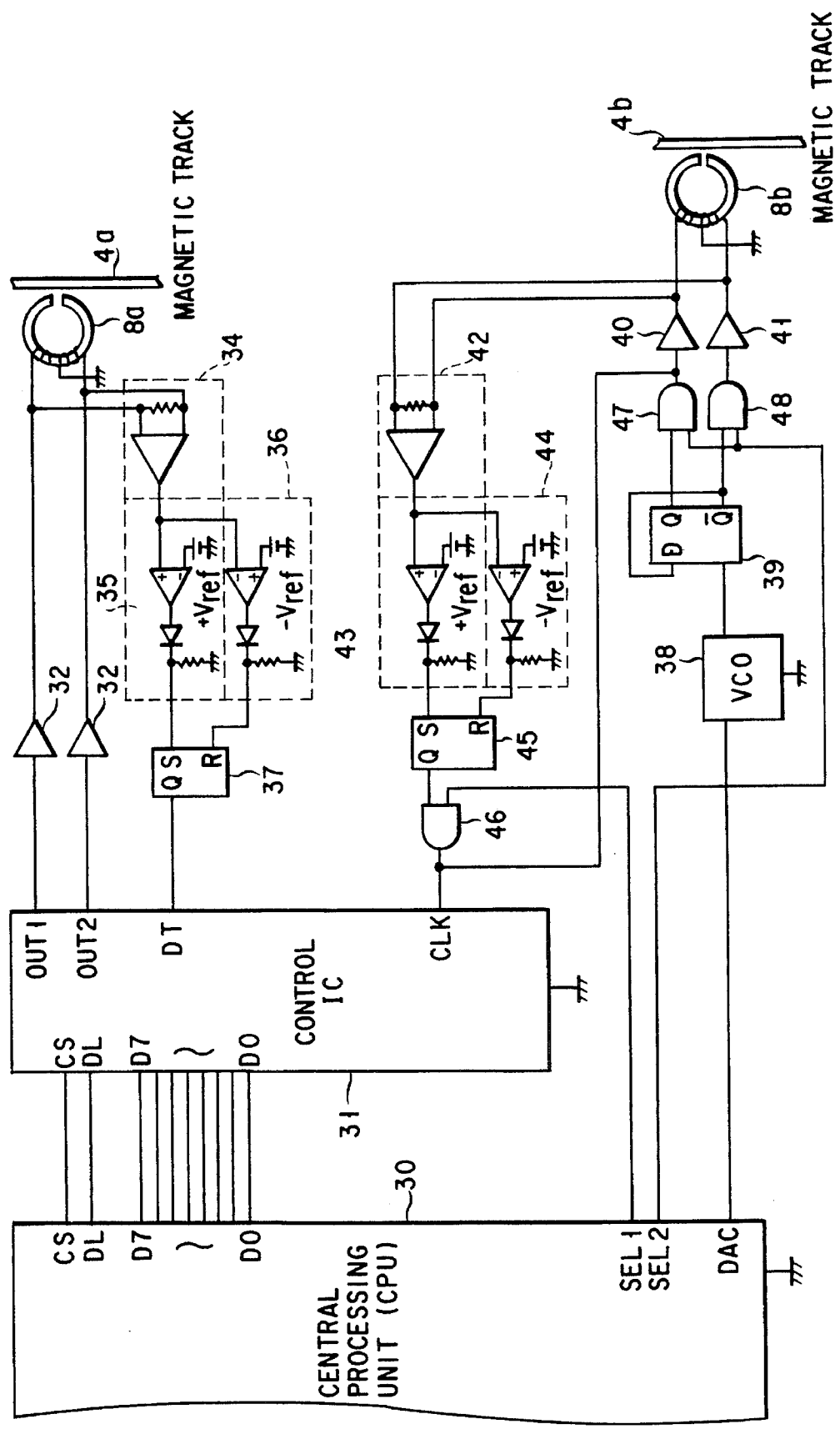
FIG. 6 is a block diagram showing the arrangement of a magnetic data control circuit used when recorded sound data is processed through a magnetic recording portion (magnetic tape)

FIG. 6 is a block diagram showing the arrangement of a magnetic data control circuit used to process recorded sound data through a data recording medium (magnetic tape).

In this magnetic data control circuit, the overall control of the camera is performed by a central processing unit (CPU) 30. The CPU 30 is connected to a control IC 31 through control lines CS, DL, D7 to D0, SEL1, and SEL2. The data recording section 4 shown in FIG. 1 is driven by a control signal to record print data on a magnetic track 4a and reproduce the ISO sensitivity data and the like of a film from a magnetic track 4b.

A magnetic head 8a as part of the data write section 8 described above is used to record/reproduce print data on/from the magnetic track 4a. In this embodiment, although only sound data recording is performed on the camera side, sound data can be reproduced by using a recording unit. Buffers 32 and 33 supply currents to the magnetic head 8a in accordance with outputs from terminals OUT1 and OUT2 of the control IC 31 in a data recording operation.

A head amplifier 34 amplifies a signal generated by the magnetic head 8a in accordance with a magnetic field on the magnetic track 4a. This signal is shaped by comparators 35 and 36 and a flip-flop 37. The shaped signal is input to a terminal DT.

The control IC 31 reproduces the data on the magnetic head 8a by using the signal input to the terminal DT and a sync signal. As sync signals required for sound data recording and reproducing operations, clock signals input to a terminal CLK of the control IC 31 are used. As a clock signal for a sound data recording operation, a clock signal output from a VCO (Voltage-Controlled Oscillator) 38 is used. A control signal for the VCO 38 is output from a D/A converter incorporated in the CPU 30. This clock signal is recorded on the magnetic track 4b in parallel with the sound data recording operation. Note that the magnetic track 4b is part of the data recording section 4, similar to the magnetic track 4a.

The clock signal recorded on this magnetic track is used as a sync signal in a data reproducing operation. The output from the VCO 38 is frequency-divided by a flip-flop 39 and is subsequently output to buffers 40 and 41.

The buffers 40 and 41 supply currents to the magnetic head 8b in accordance with this output. A signal generated by the magnetic head 8b in accordance with the magnetic field on the magnetic track 4b is amplified by the head amplifier 42, and the amplified wave is shaped by comparators 43 and 44 and a flip-flop 45.

A gate 46 is controlled through the control line SEL1 of the CPU 30. In a data reproducing operation, the gate 46 outputs a clock signal, output from the flip-flop 45, to the terminal CLK. Gates 47 and 48 are controlled through the control line SEL2 of the CPU 30. In a sound data recording operation, the gates 47 ad 48 output clock signals, output from the VCO 38, to the buffers 40 and 41 and the terminal CLK of the control IC 31.

Figure 7A:
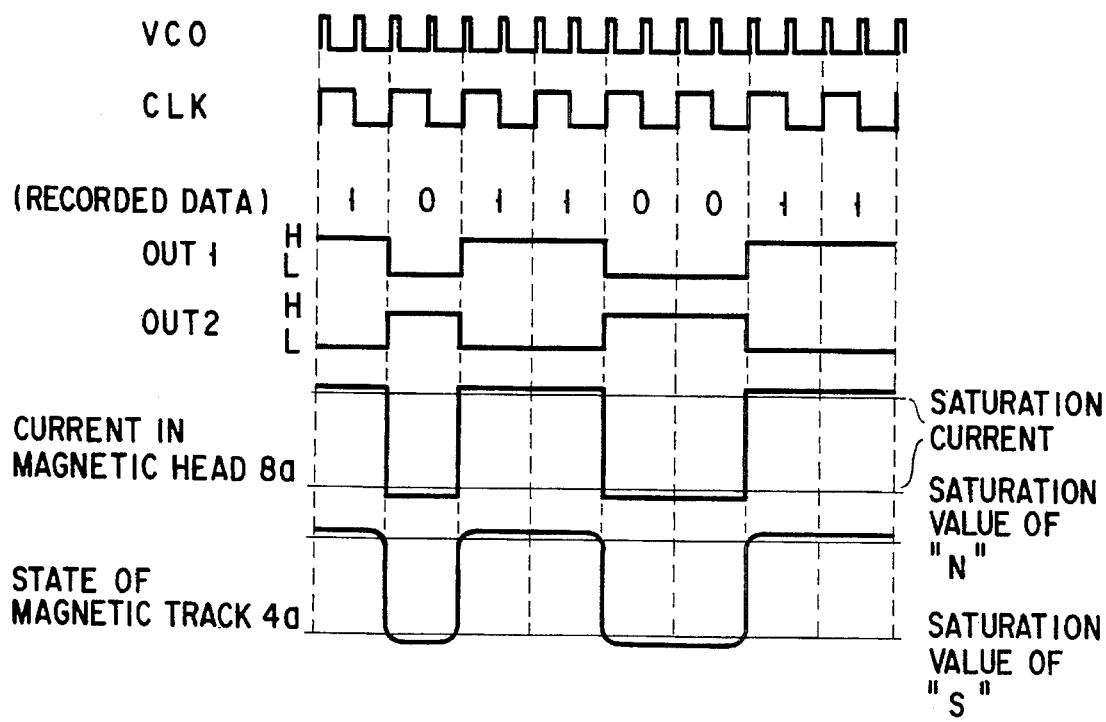
FIGS. 7A and 7B are timing charts showing a recording operation for data containing recorded sound data.
Figure 7B:
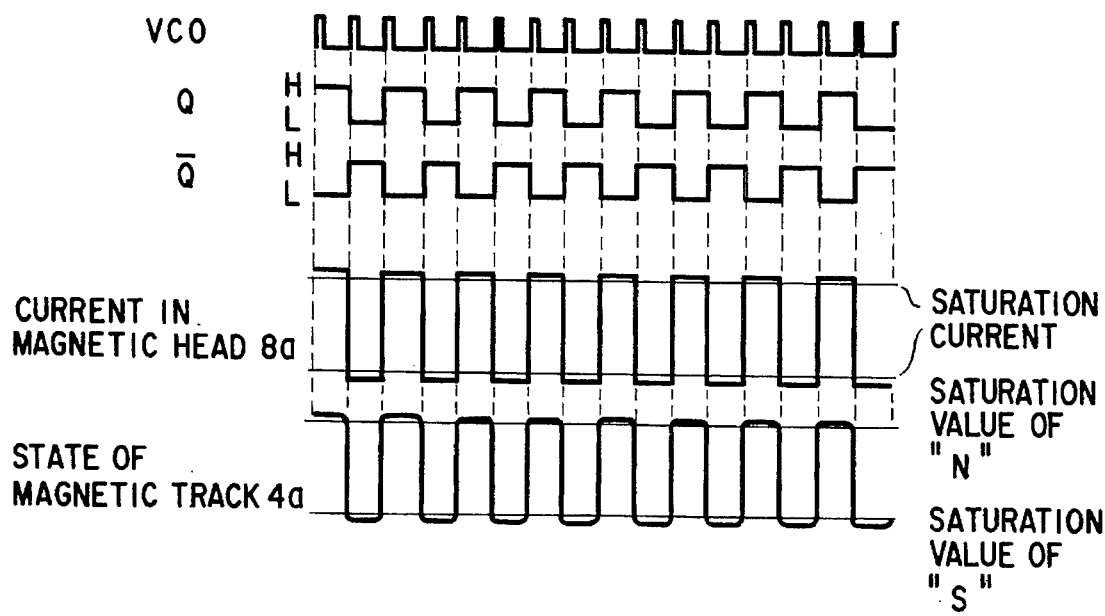

FIGS. 7A and 7B are timing charts showing a recording operation for data including recorded sound data. Assume that data "1011 0011" is to be recorded. This data is recorded such that the saturation value of magnetization "N" (or the saturation value of "S") is caused to correspond to binary data "1", while the saturation value of magnetization "S" (or the saturation value of "N") is cause to correspond to "0".

This recording scheme is called the NRZ (Non Return to Zero) scheme. If data "1" is to be recorded, an "H" signal is output from the terminal OUT1 for a predetermined period of time. In accordance with the output from the terminal OUT1, the buffer 32 supplies the magnetic head 8a with a current required to magnetize a magnetic band. The magnetic band is magnetized to the saturation value of "N".

If data "0" is to be recorded, an "H" signal is output from the terminal OUT2 for a predetermined period of time. In accordance with this signal, the buffer 33 supplies a current to the magnetic head 8a to magnetize the magnetic band to the saturation value of "S".

The time during which the control IC 31 outputs signals from the terminals OUT1 and OUT2 is determined by a clock signal input to the terminal CLK. This clock signal is obtained by frequency-dividing a clock signal output from the VCO 38. While data is recorded on the magnetic track 4a, a sync signal is recorded on the magnetic track 4b. A clock signal from the VCO 38 is frequency-divided by the flip-flop 39. The resultant signals are output from a terminal Q and a terminal $\overline{Q}$ (from which a signal obtained by inverting a signal from the terminal Q is output). The clock signals output from the terminals Q and $\overline{Q}$ are input to the buffers 40 and 41. These two buffers supply currents to the magnetic head 8b to magnetize the magnetic band to the saturation value of "N" or "S".

Figure 8:
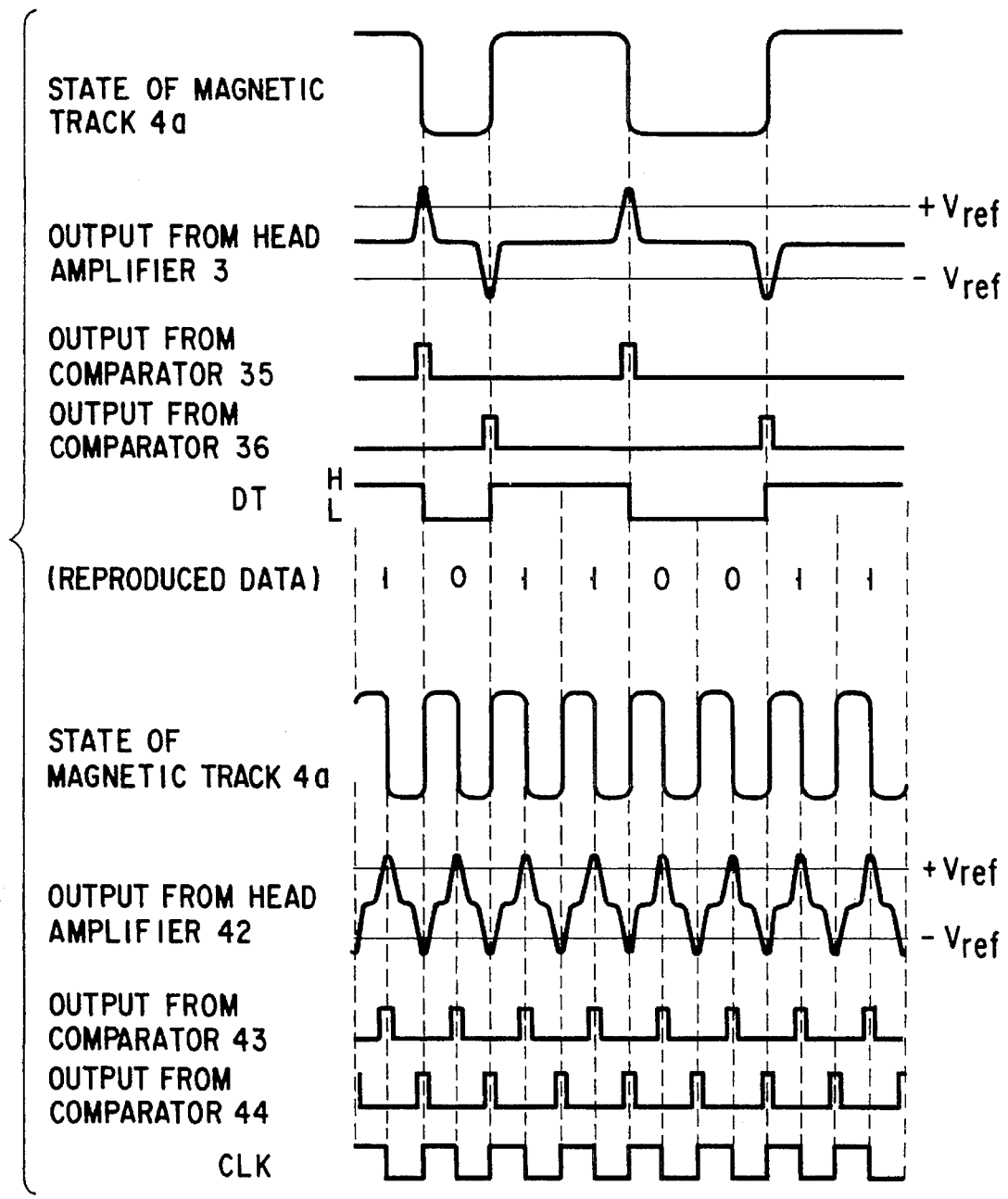
FIG. 8 is a timing chart showing a data reproducing operation.

FIG. 8 is a timing chart showing a data reproducing operation.

When the magnetized magnetic band moves in front of the magnetic head, a magnetic flux passing the magnetic head changes to generate a voltage corresponding to the data recorded on the magnetic band. If the magnetic track 4a is magnetized in the manner shown in FIG. 8, the magnetic head 8a generates a voltage at a position where magnetic inversion occurs. This voltage is amplified by the head amplifier 34 and is output to the comparators 35 and 36. The comparators 35 and 36 compare the output from the head amplifier 34 with a reference voltage +Vref and a reference voltage −Vref, respectively.

The comparator 35 detects a change from data "0" to data "1". The comparator 36 detects a change from data "0" to data "1". The outputs from the comparators 35 and 36 are converted into data signals by the flip-flop 37 and are input to the terminal DT of the control IC 31. The control IC 31 reproduces the input data. As a synch signal, the clock signal (CLK) recorded on the magnetic track is used. This signal is detected by the magnetic head 8b. An output voltage from the magnetic head 8b is amplified by the head amplifier 42 and is subsequently converted into a clock signal by the comparators 43 and 44 and the flip-flop 45. The clock signal is then output to the terminal CLK of the control IC 31.

A method of performing communication between the central processing unit (CPU) 30 and the control IC 31 will be described next with reference to the timing charts shown in FIG. 9 to 11. A communication operation is started when the CPU 30 switches the control line CS from "H" level to "L" level. Assume that a communication request is generated by the CPU 30.

Upon setting the control line CS to "L" level, the CPU 30 outputs a command to the 8-bit data bus lines D7 to D0 in synchronism with a signal DL. This command data is used by the control IC 31 to identify a communication mode. Therefore, in any communication mode, command data is located (prepared) at the head of communication data.

FIG. 9 is a timing chart of a store mode (communication). In the store mode, data to be recorded is stored in a memory of the control IC 31 before the data is recorded on the magnetic track. After command data is output, the CPU 30 outputs data to be recorded in the order in which the data are recorded on the magnetic track. When transfer of all the data is completed, the CPU 30 changes the line CS from "L" level to "H" level, thus completing the communication.

FIG. 10 is a timing chart of a write mode (communication). The write mode is a mode for recording data on the magnetic track. Upon reception of command data from the CPU 30, the control IC 31 outputs data stored in the memory to the terminals OUT1 and OUT2 in synchronism with a clock signal input to the terminal CLK.

When all the data stored in the memory are output, an end signal is output to the line DL. Upon detection of this end signal, the CPU 30 changes the line CS from "L" level to "H" level, thus terminating the communication. In this case, two types of sync (clock) signals are input to the terminal CLK.

When data is recorded on the magnetic track 4a for the first time, a sync signal output from the VCO 38 is output to the terminal CLK. This synch signal is recorded, as a sync signal, on the magnetic track 4. As a result, as indicated by a portion *, the line SEL2 is changed from "L" level to "H" level.

As a sync signal in the second and subsequent data recording operations, the sync signal which has already been recorded on the magnetic track 4 may be used. Therefore, as indicated by a portion **, the line SEL1 is changed from "L" level to "H" level. With this change in level, the signal reproduced from the magnetic track 4a is output, as a sync signal, to the terminal CLK.

Figures 11, 12:
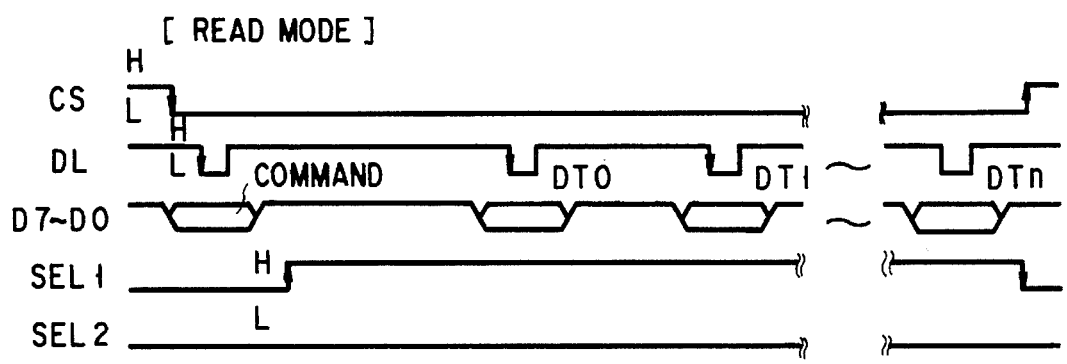
FIG. 11 is a timing chart of a read mode (communication)
FIG. 12 is a chart showing the contents of data processed as sound data.

FIG. 11 is a timing chart of a read mode (communication). The read mode is a mode for reproducing data recorded on the magnetic track 4. Upon outputting command data, the CPU 30 changes the line SEL1 from "L" level to "H" level.

With this change in level, the sync signal reproduced from the magnetic track 4 is output to the terminal CLK. The CPU 30 reads data from the magnetic track 4a in synchronism with this sync signal. Upon reading and inputting 8-bit data, the CPU 30 outputs it to the bus lines D7 to D0. Since the control IC 31 outputs a signal to the DL latch for the data line, the CPU 30 fetches the data in synchronism with the signal to the line DL. The data reproducing operation is continuously performed until the line CS is changed from "L" level to "H" level.

The contents of data treated as sound data will be described next.

FIG. 12 shows data to be recorded on the magnetic track 4a (4b) by the data recording section 4 of the imaging section 1. In this case, data [PRI] at Nos. 1 to 3 constitutes a signal indicating that the data of a frame count is input immediately after the signal, and data [24] at Nos. 4 and 5 indicates the frame count.

[SOUND] at Nos. 6 to 10 constitutes a signal for indicating that sound data is input immediately after the signal. At Nos. 11 to N, digital data corresponding to recorded sound data are recorded. The actual data [PRI] and [SOUND] other than the sound data are based on a character data table standardized by ISO.

Note that the description made with reference to FIGS. 5 to 11 is viewed from the camera side. Especially on the camera side, recorded sound data is stored and written.

In film development and enlargement, reading, i.e., reproduction, of recorded sound data is performed. This operation is performed in accordance with the timing chart of the read mode shown in FIG. 11. The arrangement of the magnetic data control circuit, the data conversion of recorded sound data, and the like shown in FIG. 6 can be basically realized by the same arrangement and scheme in film development or enlargement.

Reading/reproduction of recorded sound data in the embodiment will be described next with reference to FIGS. 13 to 15.

FIG. 1B shows the arrangement of a recorded sound data read system.

For example, this recorded sound data read system is a recorded data read section 51 constituted by a magnetic head and designed to read recorded data including recorded sound data recorded by the data recording section 4.

The contents of data read by the recorded data read section 51 are determined by a recorded data determining section 52. Only recorded sound data is extracted from the data, recorded by the data recording section 4, by a data transfer section 53 on the basis of the determination result from the recorded data determining section 52.

The contents of the recorded sound data transferred from the buffer 33 are stored in a detachable sound data storage section 54. As this sound data storage section 54, a known memory element may be used.

As described above, in the recorded sound data read system, only the sound data stored in the sound data storage section 54 is read out to be supplied to a sound output unit.

FIG. 14 shows the arrangement of a sound reproducing unit for extracting sound data from the camera having the sound recording function according to the embodiment. FIG. 15 shows the outer appearance of an album type sound reproducing unit.

The sound reproducing unit shown in FIG. 14 comprises the sound data storage section 54 described above, a sound reproducing unit control section 55 for controlling the sound reproducing unit, a cover opening/closing SW 56 as a switch for performing sound reproduction, and a loudspeaker 57 for generating a sound output.

The album type sound reproducing unit shown in FIG. 15 is constituted by an album main body 58 including the cover opening/closing SW 56, the loudspeaker 57, and the sound reproducing unit, a photograph 59 contained in the album, and a battery cover 60 arranged in the album main body 58 to house a battery for driving the album type sound reproducing unit.

According to the album type sound reproducing unit having the above-described arrangement, when the cover of the album main body 58 is opened in a direction indicated by an arrow in FIG. 15, the cover opening/closing SW 56 is turned on to energize the sound reproducing unit control section 55. With this operation, sound data recorded by the camera and stored in the sound record storage section 54 is reproduced by the loudspeaker 57.

When the album main body 58 is closed, the cover opening/closing SW 56 is turned off to stop the sound output.

In the first embodiment, in the camera for recording sound data on an imaging portion (film) as well as an object image, a sound recording operation is performed before a photographic operation, and sound data is recorded on the imaging portion in synchronism with a film wind-up operation.

In a rapid sequence operation, a continuous sound recording time corresponding to a rapid sequence frame count is ensured, and a continuous sound recording operation is performed in synchronism with a film wind-up operation.

As described above, in a still picture photographic operation using a film having a magnetic recording portion, while exposure is performed, sound data before or after the exposure is recorded on the magnetic recording portion, thereby providing a camera having a sound recording function, which causes no change in a predetermined frame count even if a sound recording operation is performed.

FIG. 16 is a block diagram showing the schematic arrangement of a camera having a sound recording function according to the second embodiment of the present invention.

This camera has a system controller 62 constituted by a CPU and designed to control the overall unit.

The following components arranged on the camera are connected to the system controller 62 to be controlled: a distance measuring section 63, a photometric section 64, an exposure control section 69, a recording section 66 including a magnetic head 73, a wind-up drive 67, a RAM 68, a microphone 69, and the like.

Distance data, from the distance measuring section 63, representing the distance to an object to be photographed, photometric data such as an object brightness from the photometric section 64, sound data obtained by sampling sounds around the camera and supplied from the microphone 69, stored data from the RAM 68, ON/OFF data from first and second release switches 76 and 77, and the like are input to the system controller 62. Note that the sound data input from the microphone 69 is encoded by an encoding section (not shown) and is input to the system controller 62. The RAM 68, the microphone 69, and the encoding section (not shown) constitute a sound data storage section.

The wind-up drive 67 drives a wind-up motor 72 coupled to a spool near an wind-up/rewind section 11 so as to wind up a film (not shown).

The recording section 66 drives the magnetic head 73 arranged above the rear side of the wind-up/rewind section 11 to magnetically record sound data on the magnetic track of the film.

The exposure control section 65 controls an exposure mechanism such as a lens shutter 75 arranged behind a photographic optical system 74 on its optical axis. In this embodiment, the lens shutter is used as the exposure mechanism. It is apparent, however, that the present invention is not limited to this and can be applied to an exposure mechanism having a focal plane shutter, a stop, or the like.

Figure 17:
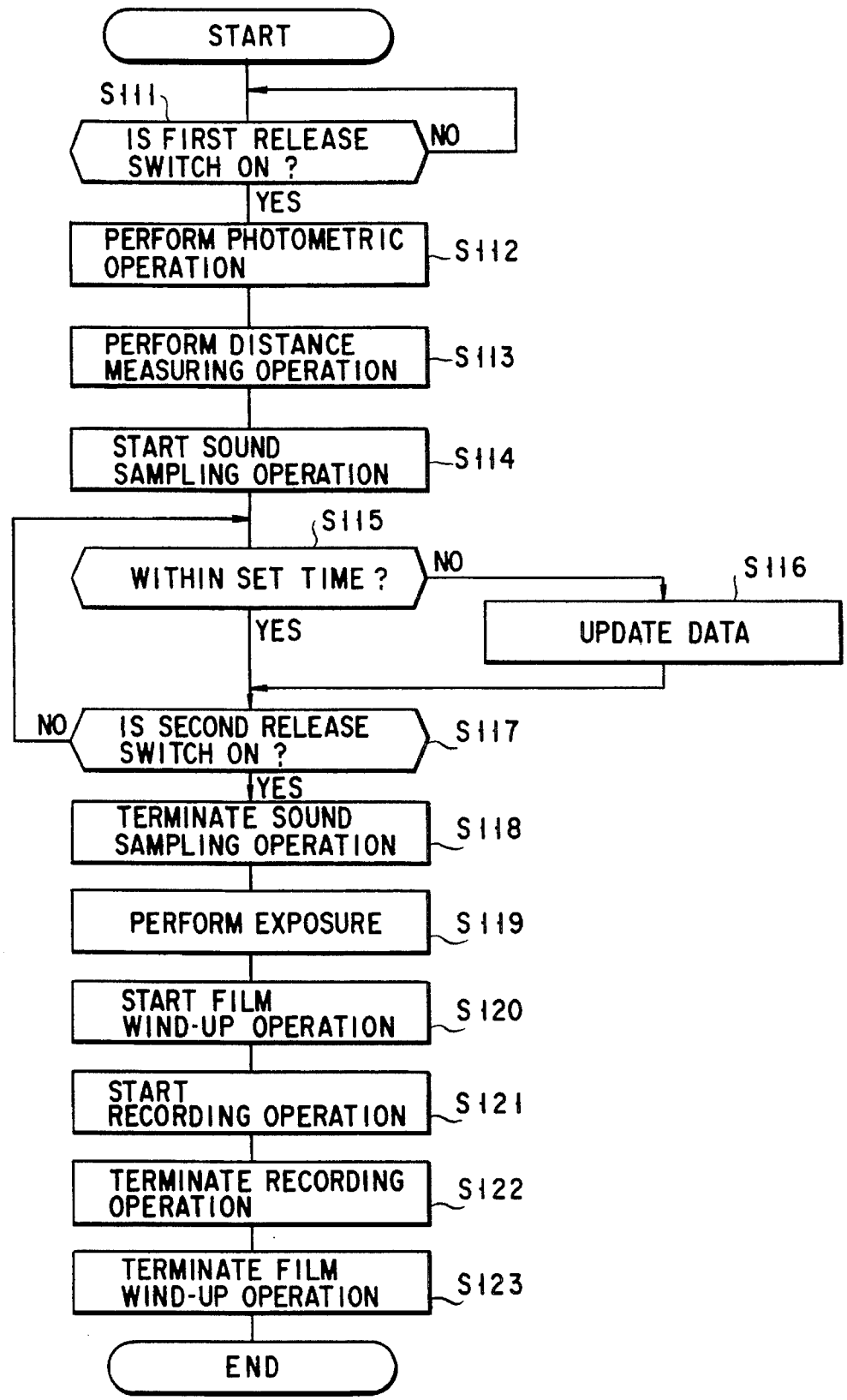
FIG. 17 is a flow chart showing an operation of the camera in FIG. 16.

An operation of the camera of the second embodiment will be described below with reference to the flow chart shown in FIG. 17.

First, it is checked whether the first release switch 76 is ON (step S111). If it is determined that the first release switch 76 is OFF (NO), the flow returns to step S1 to wait until the first release switch 76 is turned on. If the first release switch 76 is ON (YES), a photometric operation is performed by the photometric section 64 (step S112), and a distance measuring operation is performed by the distance measuring section 63 (step S113).

Subsequently, sampling of external sounds input through the microphone 69 is started (step S114). This input sound data is encoded by the encoding section (not shown) and is stored in the RAM 68 through the system controller 62. The maximum sampling time is defined as a set time. For example, this set time is preferably set to be about 3 to 5 sec, although it depends on the capacity of the RAM 68 and the like.

At the same time when a sound sampling operation is started, the sampling time is counted by a time measuring unit (not shown). By comparing this sampling time with the set time, it is checked whether the set time has elapsed (step S115).

If it is determined that the sound sampling operation is continuously performed over the set time (NO), old sound data corresponding to a time by which the sampling time exceeds the set time is erased, and only new sound data is stored in the RAM 68. After this storage processing or if the sampling time is within the set time (YES), it is checked whether the second release switch 77 is ON (step S117).

If it is determined that the second release switch 77 is OFF (NO), the flow returns to step S115 to check whether the set time has elapsed. If the second release switch 77 is ON (YES), the sound sampling operation is completed (step S118). That is, sound sampling is 10 completed before exposure or a film wind-up operation. Therefore, the sound sampling operation and the film wind-up operation are not performed simultaneously.

Subsequently, the exposure mechanism such as the lens shutter 75 is driven by the exposure control section 65 to expose the film (step S119). Upon completion of this exposure, the wind-up motor 72 is driven by the wind-up drive 67 to start a film wind-up (a film advance) operation (step S120).

While the film is wound up, the magnetic head 73 is driven by the recording section 66 to start recording the sound data, stored in the RAM 68, on the magnetic track (magnetic recording portion) of the film (step S121). Note that, as described above, since this sound data is encoded, the data can be compressed when it is recorded on the magnetic track, thereby increasing the amount of data to be recorded.

When recording of the data on the magnetic track of the film (step S122) and the film wind-up operation (step S123) are completed, the sequence is terminated.

with the second embodiment having the above-described arrangement, conditions for photography after a first release operation, e.g., an F-number (aperture value) and a shutter speed, the name of an object, the name of a place, and the like can be easily recorded. Sound sampling can be performed at a timing different from that of a film wind-up operation or that of a recording operation with respect to the magnetic recording portion of the film. Besides, the sampling operation is completed before the film wind-up operation. Therefore, drive noise generated in a film wind-up operation is not recorded. Furthermore, since a sampling operation can be started regardless of the time required for a film wind-up operation, sound data need not be hastily recorded during a film wind-up operation as in the prior art.

If encoded sound data is stored upon compression, data can be recorded on the magnetic recording portion of a film in a larger quantity than in the prior art.

In this embodiment, a sampling operation is started in response to a signal indicating that the first release switch is ON. However, as is apparent, the same effect can be obtained even if a recording button or the like may be additionally arranged, and a sound sampling operation may be started by depressing the recording button.

Note that the data to be compressed is not limited to sound data, and that this data compression can be equally applied to signals to be recorded on the magnetic recording medium of a film.

In the camera of the second embodiment, sounds (sound data) around the camera are temporarily stored in the sound data storage section, and the sound data stored in the sound data storage section is recorded on the magnetic track of a film during a film wind-up (a film advance) operation, thus preventing drive noise caused by the film wind-up motor from being recorded.

As has been described above, according to the present invention, there is provided a camera having a sound recording function, in which a predetermined frame count does not change depending on whether a sound recording operation in a photographic operation is performed, and a sound recording time can be arbitrarily set, thereby removing drive noise.

Additional advantages and modifications will readily occur to those skilled in the art. Therefore, the invention in its broader aspects is not limited to the specific details, and representative devices, shown and described herein. Accordingly, various modifications may be made without departing from the spirit or scope of the general inventive concept as defined by the appended claims and their equivalents.

What is claimed is:

1. A camera having a sound recording function, comprising:

a camera body allowing a film having a magnetic recording portion to be loaded therein;

a manual operation member for outputting a first signal in response to an initial operation of the camera and for outputting a second signal in response to a camera operation following the initial operation;

sound data storage means for continuously sampling sounds around said camera to produce sound data during a sampling period initiated by the first signal, storing said sound data sampled within a period of time having a preset maximum duration, and updating the stored sound data if the sampling period exceeds the preset maximum duration, said sound data storage means including a sound input microphone, a converter for converting the sound data sampled by said microphone into encoded data, and a semiconductor memory for temporarily storing the encoded data;

exposure means for executing an exposure operation in response to the second signal;

film advance means for winding up said film by one frame upon completion of the exposure operation; and magnetic recording means for reading out the updated data stored in said semiconductor memory and for recording the read out data on the magnetic recording portion while said film advance means winds up said film by one frame, after completion of said exposure operation, said magnetic recording means including a magnetic head and a driving circuit for said magnetic head.

2. A camera according to claim 1, further comprising display means for displaying that the sound data is being sampled.

3. A camera according to claim 1, wherein said sound data storage means terminates said sampling period in response to said second signal.

4. A camera having a sound recording function, comprising:

a camera body allowing a film having a magnetic recording portion to be loaded therein;

sound data storage means for continuously sampling sounds around said camera to produce sound data during a sampling period prior to a photographic operation in response to a photography start signal, storing said sound data sampled within a period of time having a preset maximum duration, and updating the stored sound data if the sampling period exceeds the preset maximum duration, said sound data storage means including a sound input microphone, a converter for converting the sound data sampled by said microphone into encoded data, and a semiconductor memory for temporarily storing the encoded data;

film advance means for feeding said film; and magnetic recording means for reading out the updated data stored in said semiconductor memory and for recording the read out data on the magnetic recording portion while a film advance operation is performed by said film advance means, said magnetic recording means including a magnetic head and a driving circuit for said magnetic head.

5. A camera according to claim 4, further comprising an operation member for producing a photography start signal for designating a start of a sound recording operation so that the sound sampling operation is started in response to the photography start signal output when said operation member is operated.

6. A camera according to claim 5, wherein said operating member comprises a release switch and outputs a signal for designating a start of the sound recording operation when said release switch is in a state of half-depression.

7. A camera according to claim 4, wherein said sound data storage means executes a sound data storing operation at least when an actuator is not operated.

8. A camera according to claim 7, wherein said actuator comprises an actuator for exposure control.

9. A camera according to claim 7, wherein said actuator comprises a film feed motor included in said film advance means.

10. A camera according to claim 4, wherein said sound data storage means sequentially updates the sound data stored in said semiconductor memory in a chronological order when a sound data storing operation is continuously performed for a predetermined period of time.

11. A camera according to claim 4, wherein said magnetic recording means executes a magnetic recording operation in synchronism with a one-frame wind-up operation performed by said film advance means after an exposure operation.

12. A camera according to claim 4, wherein said sound data storage means terminates a sound sampling operation immediately before an exposure operation.

13. A camera according to claim 4, further comprising display means for displaying that sound data is being sampled.

14. A camera according to claim 4, wherein said sound data storage means further includes:

timepiece means for measuring a sound sampling time; and display means for displaying a remaining sound data storing time in accordance with a measurement output from said timepiece means.

15. A camera according to claim 4, wherein said sound data storage means further includes means for clearing sound data stored in said semiconductor memory after a recording operation of said magnetic recording means is completed.

16. A camera according to claim 4, wherein said sound data storage means further includes means for interrupting a sampling operation when an exposure start signal is input during sampling of the sound data.

17. A camera according to claim 4, wherein said sound data storage means further includes:

determining means for determining whether a level of sampled sound data is higher than a predetermined value; and display means for displaying a sampling state indication on the basis of a determination result from said determining means.

18. A camera according to claim 7, wherein said sound data storage means executes a sampling operation again when said determining means produces a determination result indicating that the level of the sampled sound data is lower than the predetermined value.

19. A camera according to claim 4, wherein said sound data storage means terminates said sampling period in response to a photographic operation that follows said photography start signal.

20. A camera of the type capable of executing a sequential photographing operation and capable of writing various data, corresponding to photographed frames, in a magnetic recording portion of a film, comprising:

recording means for recording data on the magnetic recording portion of the film during a wind-up operation of said film;

sound data storage means for sampling sounds around said camera, within a predetermined time duration prior to a photographic operation in response to a photography start signal, and for storing sampled sound data before or after an exposure sequence; and control means for controlling said recording means to extract an output from said sound data storage means to perform a data recording operation during a film advance operation;

wherein said sound data storage means changes a sound sampling time in accordance with a change in a photographic mode to a single frame shooting mode or a rapid sequence mode, and wherein when the sound sampling operation is performed after the exposure sequence is selected, said film is rewound to a start frame of a rapid sequence operation, and sound data is subsequently recorded while consecutively photographed frames are wound up.

21. A camera of the type capable of executing a sequential photographing operation and capable of writing various data, corresponding to photographed frames, in a magnetic recording portion of a film, comprising:

recording means for recording data on the magnetic recording portion of the film during a wind-up operation of said film;

sound data storage means for sampling sounds around said camera, within a predetermined time duration prior to a photographic operation in response to a photography start signal, and for storing sampled sound data before or after an exposure sequence; and control means for controlling said recording means to extract an output from said sound data storage means to perform a data recording operation during a film advance operation;

wherein said sound data storage means changes a sound sampling time in accordance with a change in a photographic mode to a single frame shooting mode or a rapid sequence mode, and wherein when the sound sampling operation is performed after the exposure sequence is selected, said film is rewound to a start frame of a rapid sequence operation after sound sampling is performed, and sound data is subsequently recorded while consecutively photographed frames are wound up.

22. A camera of the type capable of executing a sequential photographing operation and capable of writing various data, corresponding to photographed frames, in a magnetic recording portion of a film, comprising:

recording means for recording data on the magnetic recording portion of the film during a wind-up operation of said film;

sound data storage means for sampling sounds around said camera, within a predetermined time duration prior to a photographic operation in response to a photography start signal, and for storing sampled sound data before or after an exposure sequence; and control means for controlling said recording means to extract an output from said sound data storage means to perform a data recording operation during a film advance operation;

wherein said sound data storage means changes a sound sampling time in accordance with a change in a photographic mode to a single frame shooting mode or a rapid sequence mode, and wherein when the sound sampling operation is performed after the exposure sequence is selected, a sound sampling time is changed in accordance with a number of frames consecutively photographed.

\* \* \* \* \*